US011676573B2

(12) United States Patent
Stanton et al.

(10) Patent No.: US 11,676,573 B2
(45) Date of Patent: Jun. 13, 2023

(54) CONTROLLING EXPRESSIVITY IN END-TO-END SPEECH SYNTHESIS SYSTEMS

(71) Applicant: Google LLC, Mountain View, CA (US)

(72) Inventors: Daisy Stanton, Mountain View, CA (US); Eric Dean Battenberg, Sunnyvale, CA (US); Russell John Wyatt Skerry-Ryan, Mountain View, CA (US); Soroosh Mariooryad, Redwood City, CA (US); David Teh-Hwa Kao, San Francisco, CA (US); Thomas Edward Bagby, SanSan Francisco, CA (US); Sean Matthew Shannon, Mountain View, CA (US)

(73) Assignee: Google LLC, Mountain View, CA (US)

( * ) Notice: Subject to any disclaimer, the term of this patent is extended or adjusted under 35 U.S.C. 154(b) by 280 days.

(21) Appl. No.: 16/931,336

(22) Filed: Jul. 16, 2020

(65) Prior Publication Data
US 2021/0035551 A1 Feb. 4, 2021

Related U.S. Application Data

(60) Provisional application No. 62/882,511, filed on Aug. 3, 2019.

(51) Int. Cl.
*G10L 13/00* (2006.01)
*G10L 13/08* (2013.01)
(Continued)

(52) U.S. Cl.
CPC .............. *G10L 13/10* (2013.01); *G10L 13/04* (2013.01); *G10L 25/30* (2013.01); *G06N 3/044* (2023.01); *G10L 13/02* (2013.01); *G10L 13/08* (2013.01)

(58) Field of Classification Search
CPC ......... G10L 13/10; G10L 13/08; G10L 13/02; G10L 13/027; G10L 25/30; G10L 13/06;
(Continued)

(56) References Cited

U.S. PATENT DOCUMENTS 10,475,438 B1 * 11/2019 Chicote ................... G10L 13/10
2015/0186359 A1 * 7/2015 Fructuoso ............... G10L 25/30
704/8
(Continued)

OTHER PUBLICATIONS

Wang, Yuxuan, et al. "Tacotron: A fully end-to-end text-to-speech synthesis model." arXiv preprint arXiv: 1703.10135 164 (2017). (Year: 2017).*

(Continued)

*Primary Examiner* — Michael Ortiz-Sanchez
(74) *Attorney, Agent, or Firm* — Honigman LLP; Brett A. Krueger; Grant Griffith

(57) ABSTRACT

A system for generating an output audio signal includes a context encoder, a text-prediction network, and a text-to-speech (TTS) model. The context encoder is configured to receive one or more context features associated with current input text and process the one or more context features to generate a context embedding associated with the current input text. The text-prediction network is configured to process the current input text and the context embedding to predict, as output, a style embedding for the current input text. The style embedding specifies a specific prosody and/or style for synthesizing the current input text into expressive speech. The TTS model is configured to process the current input text and the style embedding to generate an output audio signal of expressive speech of the current input text. The output audio signal has the specific prosody and/or style specified by the style embedding.

22 Claims, 15 Drawing Sheets

(51) Int. Cl.
*G10L 13/10* (2013.01)
*G10L 25/30* (2013.01)
*G10L 13/04* (2013.01)
*G10L 13/02* (2013.01)
*G06N 3/044* (2023.01)

(58) Field of Classification Search
CPC ... G10L 13/086; G10L 15/1807; G10L 13/00; G10L 13/04; G10L 13/033; G06N 3/04; G06N 3/044; G06N 3/0442
See application file for complete search history.

(56) References Cited

U.S. PATENT DOCUMENTS

| | | | | |
|---|---|---|---|---|
| 2015/0364128 | A1* | 12/2015 | Zhao | G06N 3/0445 704/259 |
| 2017/0092259 | A1* | 3/2017 | Jeon | G10L 13/047 |
| 2018/0096677 | A1* | 4/2018 | Pollet | G06F 16/24 |
| 2019/0122651 | A1* | 4/2019 | Arik | G10L 13/027 |
| 2020/0082807 | A1* | 3/2020 | Kim | G10L 13/0335 |
| 2020/0306641 | A1* | 10/2020 | Kolen | A63F 13/67 |

OTHER PUBLICATIONS

International Search Report and Written Opinion for the related Application No. PCT/US2020/042416.
Daisy Stanton et al: "Predicting Expressive Speaking Style From Text In End-To-End Speech Synthesis", arxiv.org, Cornell University Library, 201 Olin Library Cornell University Ithaca, NY 14853, Aug. 4, 2018 (Aug. 4, 2018).
Yuxuan Wang et al.: "Style Tokens: Unsupervised Style Modeling, Control and Transfer in End-to-end Speech Synthesis", arxiv.org, Cornell University Library, 201 Olin Library Cornell University Ithaca, NY 14853, Mar. 24, 2018 (Mar. 24, 2018).
Rj Skerry-Ryan et al.: "Towards End-to-End Prosody Transfer for Expressive Speech Synthesis with Tacotron", arxiv.org, Cornell University Library, 201 Olin Library Cornell University Ithaca, NY 14853, Mar. 24, 2018 (Mar. 24, 2018).
Haohan Guo et al : "Conversational End-to-End TTS for Voice Agent", arxiv.org, Cornell University Library, 201 Olin Library Cornell University Ithaca, NY 14853, May 21, 2020 (May 21, 2020), XP081676072, the whole document.

* cited by examiner

CONTROLLING EXPRESSIVITY IN END-TO-END SPEECH SYNTHESIS SYSTEMS

CROSS REFERENCE TO RELATED APPLICATIONS

This U.S. patent application claims priority under 35 U.S.C. 119(e) to U.S. Provisional Application 62/882,511, filed on Aug. 3, 2019. The disclosure of this prior application is considered part of the disclosure of this application and is hereby incorporated by reference in its entirety.

TECHNICAL FIELD

This disclosure relates to using contextual features in expressive end-to-end speech synthesis systems.

BACKGROUND

Neural networks are machine learning models that employ one or more layers of nonlinear units to predict an output for a received input. For instance, neural networks may convert input text to output speech. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allows the cell to store previous states for the cell, e.g., for use in generating a current activation or to be provided to other components of the LSTM neural network.

SUMMARY

One aspect of the disclosure provides a system for generating an output audio signal of expressive speech of current input text. The system includes a context encoder, a text-prediction network in communication with the context encoder, and a text-to-speech (TTS) model in communication with the text-prediction network. The context encoder is configured to receive one or more context features associated with current input text to be synthesized into expressive speech, and process the one or more context features to generate a context embedding associated with the current input text. Each context feature is derived from a text source of the current input text. The text-prediction network is configured to receive the current input text from the text source, receive the context embedding associated with the current input text front the context encoder, and process the current input text and the context embedding associated with the current input text to predict, as output, a style embedding for the current input text. The text source includes sequences of text to be synthesized into expressive speech and the style embedding specifies a specific prosody and/or style for synthesizing the current input text into expressive speech. The TTS model is configured to receive the current input text from the text source, receive the style embedding predicted by the text-predication network, and process the current input text and the style embedding to generate an output audio signal of expressive speech of the current input text. The output audio signal has the specific prosody and/or style specified by the style embedding.

Implementations of the disclosure may include one or more of the following optional features. In some implementations, the one or more context features associated with the current input text comprise at least one of: the current input text, previous text from the text source that precedes the current input text; previous speech synthesized from the previous text; upcoming text from the text source that follows the current input text; or a previous style embedding predicted by the text-prediction network based on the previous text and a previous context embedding associated with the previous text. In some examples, the text source includes a text document and the one or more context features associated with the current input text include at least one of: a title of the text document, a title of a chapter in the text document; a title of a section in the text document; a headline in the text document; one or more bullet points in the text document; entities from a concept graph extracted from the text document; or one or more structured answer representations extracted from the text document.

In other examples, the text source includes a dialogue transcript and the current input text corresponds to a current turn in the dialogue transcript. In these examples, the one or more context features associated with the current input text include at least one of previous text in the dialogue transcript that corresponds to a previous turn in the dialogue transcript, or upcoming text in the dialogue transcript that corresponds to a next turn in the dialogue transcript.

The text source may also include a query-response system in which the current input text corresponds to a response to a current query received at the query-response system. Here, the one or more context features associated with the current input text may include at least one of text associated with the current query or text associated with a sequence of queries received at the query response-system, or audio features associated with the current query or audio features associated with the sequence of queries received at the query response-system. The sequence of queries may include the current query and one or more queries preceding the current query.

In some implementations, the TTS model includes an encoder neural network, a concatenator, and an attention-based decoder recurrent neural network. The encoder neural network is configured to receive the current input text from the text source and process the current input text to generate a respective encoded sequence of the current input text. The concatenator is configured to receive the respective encoded sequence of the current input text from the encoder neural network, receive the style embedding predicted by the textual-prediction network and generate a concatenation between the respective encoded sequence of the current input text and the style embedding. The attention-based decoder recurrent neural network is configured to receive a sequence of decoder inputs, and for each decoder input in the sequence, process the corresponding decoder input and the concatenation between the respective encoded sequence of the current input text and the style embedding to generate r frames of the output audio signal, wherein r comprises an integer greater than one.

In the implementations when the TTS model includes the encoder neural network, the encoder neural network may include an encoder pre-net neural network and an encoder CBHG neural network. The encoder pre-net neural network configured to receive a respective embedding of each character in a sequence of characters of the current input text, and for each character, process the respective embedding to generate a respective transformed embedding of the character. The encoder CBHG neural network is configured to receive the transformed embeddings generated by the encoder pre-net neural network, and process the transformed embeddings to generate the respective encoded sequence of the current input text. In some configurations, the encoder CBHG neural network includes a bank of 1-D convolutional filters, followed by a highway network, and followed by a bidirectional recurrent neural network.

In some configurations, the text-prediction network includes a time-aggregating gated recurrent unit (GRU) recurrent neural network (RNN) and one or more fully-connected layers. The GRU RNN is configured to receive the context embedding associated with the current input text and an encoded sequence of the current input text, and generate a fixed-length feature vector by processing the context embedding and the encoded sequence. The one or more fully-connected layers are configured to predict the style embedding by processing the fixed-length feature vector. In these configurations, the one or more fully-connected layers may include one or more hidden fully-connected layers using ReLU activations and an output layer that uses tanh activation to emit the predicted style embedding.

The context model, the text-prediction model, and the TTS model may be trained jointly. Alternatively, a two-step training procedure may train the TTS model during a first step of the training procedure, and separately train the context model and the text-prediction model jointly during a second step of the training procedure.

Another aspect of the disclosure provides a method for generating an output audio signal of expressive speech of current input text. The method includes receiving, at data processing hardware, current input text from a text source. The current input text is to be synthesized into expressive speech by a text-to-speech (TTS) model. The method also includes generating, by the data processing hardware, using a context model, a context embedding associated with current input text by processing one or more context features derived from the text source. The method also includes predicting, by the data processing hardware, using a text-prediction network, a style embedding for the current input text by processing the current input text and the context embedding associated with the current input text. The style embedding specifies a specific prosody and/or style for synthesizing the current input text into expressive speech. The method also includes generating, by the data processing hardware, using the TTS model, the output audio signal of expressive speech of the current input text by processing the style embedding and the current input text. The output audio signal has the specific prosody and/or style specified by the style embedding.

This aspect may include one or more of the following optional features. In some implementations, the one or more context features associated with the current input text comprise at least one of: the current input text; previous text from the text source that precedes the current input text; previous speech synthesized from the previous text; upcoming text from the text source that follows the current input text; or a previous style embedding predicted by the text-prediction network based on the previous text and a previous context embedding associated with the previous text. In some examples, the text source includes a text document and the one or more context features associated with the current input text include at least one of a title of the text document, a title of a chapter in the text document; a title of a section in the text document, a headline in the text document, one or more bullet points in the text document, entities from a concept graph extracted from the text document; or one or more structured answer representations extracted from the text document.

In other examples, the text source includes a dialogue transcript and the current input text corresponds to a current turn in the dialogue transcript. In these examples, the one or more context features associated with the current input text include at least one of previous text in the dialogue transcript that corresponds to a previous turn in the dialogue transcript, or upcoming text in the dialogue transcript that corresponds to a next turn in the dialogue transcript.

The text source may also include a query-response system in which the current input text corresponds to a response to a current query received at the query-response system. Here, the one or more context features associated with the current input text may include at least one of text associated with the current query or text associated with a sequence of queries received at the query response-system, or audio features associated with the current query or audio features associated with the sequence of queries received at the query response-system. The sequence of queries may include the current query and one or more queries preceding the current query.

In some implementations, generating the output audio signal includes: receiving, at an encoder neural network of the text-to-speech model, the current input text from the text source; generating, using the encoder neural network, a respective encoded sequence of the current input text, generating, using a concatenator of the text-to-speech model, a concatenation between the respective encoded sequence of the current input text and the style embedding; receiving, at an attention-based decoder recurrent neural network of the text-to-speech model, a sequence of decoder inputs; and for each decoder input in the sequence of decoder inputs, processing, using the attention-based decoder recurrent neural network, the corresponding decoder input and the concatenation between the respective encoded sequence of the current input text and the style embedding to generate r frames of the output audio signal, wherein r includes an integer greater than one. In these implementations, generating the respective encoded sequence of the current input text includes receiving, at an encoder pre-net neural network of the encoder neural network, a respective embedding of each character in a sequence of characters of the current input text, for each character in the sequence of characters, processing, using the encoder pre-net neural network, the respective embedding to generate a respective transformed embedding of the character; and generating, using an encoder CBHG neural network of the encoder neural network, respective encoded sequence of the current input text by processing the transformed embeddings. In some configurations, the encoder CBHG neural network includes a bank of 1-D convolutional filters, followed by a highway network, and followed by a bidirectional recurrent neural network.

In some examples, predicting the style embedding for the current input text includes: generating, using a time-aggregating gated recurrent unit (GRU) recurrent neural network (RNN) of the text-prediction model, a fixed-length feature vector by processing the context embedding associated with the current input text and an encoded sequence of the current input text; and predicting, using one or more fully-connected layers of the text-prediction model that follow the GRU-RNN, the style embedding by processing the fixed-length feature vector. The one or more fully-connected layers may include one or more hidden fully-connected layers using ReLU activations and an output layer that uses tanh activation to emit the predicted style embedding.

The context model, the text-prediction model, and the TTS model may be trained jointly. Alternatively, a two-step training procedure may train the TTS model during a first step of the training procedure, and separately train the context model and the text-prediction model jointly during a second step of the training procedure.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
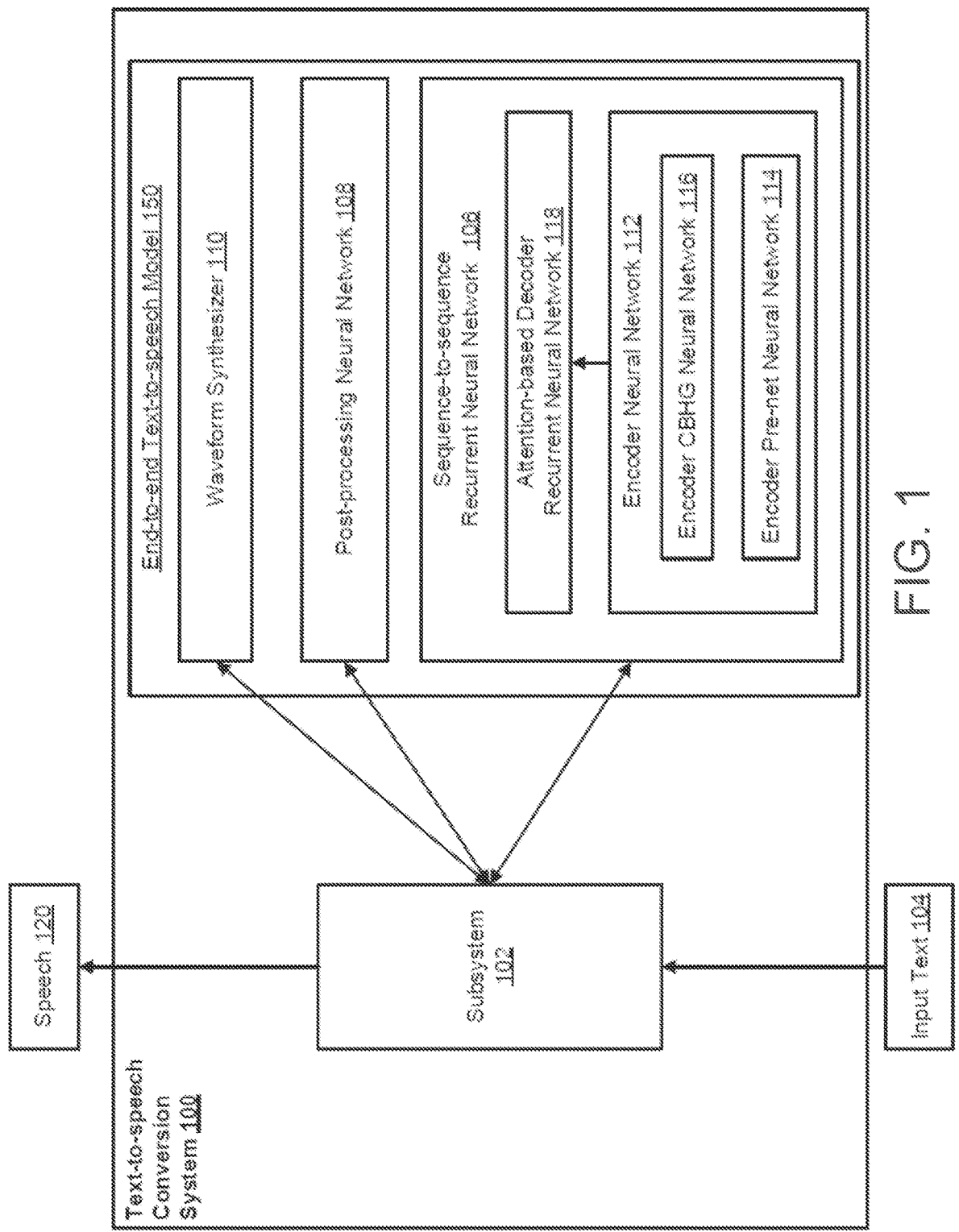
FIG. 1 is a schematic view of an example text-to-speech conversion system.

The synthesis of realistic human speech is an underdetermined problem in that a same text input has an infinite number of reasonable spoken realizations. While end-to-end neural network-based approaches are advancing to match human performance for short assistant-like utterances, neural network models are sometimes viewed as less interpretable or controllable than more conventional models that include multiple processing steps each operating on refined linguistic or phonetic representations.

A major challenge for text-to-speech (TTS) systems is developing models for producing a natural-sounding speaking style for a given piece of input text. Particularly, some of the factors that contribute to the challenge for producing natural-sounding speech include high audio fidelity, correct pronunciation, and acceptable prosody and style, whereby "prosody" generally refers to low-level characteristics such as pitch, stress, breaks, and rhythm. Prosody impacts "style", which refers to higher-level characteristics of speech such as emotional valence and arousal. As such, prosody and style are difficult to model because they encompass information not specified in the text to be synthesized, and allow the synthesized speech to be spoken in an infinite number of ways. Simply put, text is underspecified in that information about style and prosody is not available, leaving mapping from text to speech a one-to-many problem.

While providing high-level style labels (e.g., conveying emotion) or low-level annotations (e.g., syllabic stress markers, speed controls, pitch tracks, etc.) as inputs to a synthesizer may improve the modeling of prosody and style, there are a number of drawbacks to these approaches. Namely, explicit labels are difficult to define with precisions, costly to acquire, noisy in nature, and do not guarantee a correlation with perceptual quality by a listener. Moreover, explicit label inputs for modeling prosody and style are often derived from hand-tuned heuristics or separately trained models. In addition, the context from which these inputs were derived from is usually lost.

Generally, TTS systems generate speech by synthesizing a single sentence or paragraph at a time. As a result, when context from which a piece of text is drawn is not accessible, the natural expressivity of the resulting synthesized speech is limited. It is particularly challenging to convey a wide-range of speaking styles when synthesizing speech from long-form expressive datasets of text, such as audiobooks. For instance, simply collapsing a wide-range of different voice characteristics into a single, averaged model of prosodic style results in synthesized speech having a specific speaking style that may not accurately reflect an appropriate emotional valence and arousal that the text is meant to convey. In an example, applying a single, averaged model of prosodic style for synthesizing speech for an audiobook will not adequately represent all of the speaking styles needed to convey different emotions, such as emotional transitions from a happy chapter in the audiobook to a following sad chapter in the audiobook. Similarly, audiobooks may contain character voices with significant style variation. In these examples, using the averaged model of prosodic style will produce monotonous-sounding speech that does not convey emotional transitions or the variation of style between different character voices. While providing reference audio that conveys a target prosodic style for the speech to be synthesized or manually-selecting weights to select the target prosodic style at inference time may effectively disentangle factors of different speaking styles, these approaches are trained on supervised learning models and are not ideal for synthesizing speech from such long-form expressive datasets of input text (e.g., audiobooks).

Implementations herein are directed toward exemplary architectures configured to apply prosodic style embeddings as "virtual" speaking style labels for use in an end-to-end text-to-speech (TTS) model for producing synthesized speech from an input text sequence. As will become apparent, these exemplary architectures can be trained using unsupervised models to learn and predict stylistic renderings from context derived from the input text sequence alone, requiring neither explicit labels during training nor other auxiliary inputs at inference. As such, these implementations are able to capture speaker-independent factors of variation, including speaking style and background noise, from text alone.

Implementations herein are further directed toward a context-prediction system configured to receive additional context features as conditional inputs for predicting stylistic renderings for a current input text sequence. Here, the input text sequence and each context feature may serve as context for predicting a suitable stylistic rendering of the speech synthesized front the input text sequence. The context features may include word embeddings, sentence embeddings, and/or speech tags (e.g., noun, verb, adjective, etc.) As used herein, available context features can include, without limitation, previous/past text, upcoming/future text, and previous-past audio. To put another away, context features may be derived from a text source of the current input text to be synthesized. Additional sources of context features can be obtained from a document structure containing the text to be synthesized, such as title, chapter title, section title, headline, bullet points, etc. In some examples, concepts relating to entities from a concept graph (e.g., Wikipedia) and/or a structured answer representation are sources contextual features. Moreover, in a digital assistant setting, audio/text features derived from a query (or sequence of queries) may be used as contextual features when synthesizing a response, while text of a previous and/or next "turn" in a dialogue may be derived as contextual features for synthesizing corresponding dialogue. Additionally or alternatively, characters and objects (e.g., emoji's) present within a virtual environment may also be sources of contextual features for predicting stylistic renderings for a current input text sequence.

Referring to FIG. 1, in some implementations, an example text-to-speech (TTS) conversion system 100 includes a subsystem 102 that is configured to receive input text 104 as an input and to process the input text 104 to generate speech 120 as an output. The input text 104 includes a sequence of characters in a particular natural language. The sequence of characters may include alphabet letters, numbers, punctuation marks, and/or other special characters. The input text 104 can be a sequence of characters of varying lengths. The text-to-speech conversion system 100 is an example of a system implemented as computer programs on one or more computers in one or more locations, in which the systems, components, and techniques described below can be implemented. For instance, the system 100 may execute on a computer system 900 of FIG. 9.

To process the input text 104, the subsystem 102 is configured to interact with an end-to-end text-to-speech model 150 that includes a sequence-to-sequence recurrent neural network 106 (hereafter "seq2seq network 106"), a post-processing neural network 108, and a waveform synthesizer 110.

After the subsystem 102 receives input text 104 that includes a sequence of characters in a particular natural language, the subsystem 102 provides the sequence of characters as input to the seq2seq network 106. The seq2seq network 106 is configured to receive the sequence of characters from the subsystem 102 and to process the sequence of characters to generate a spectrogram of a verbal utterance of the sequence of characters in the particular natural language.

In particular, the seq2seq network 106 processes the sequence of characters using (i) an encoder neural network 112, which includes an encoder pre-net neural network 114 and an encoder CBHG neural network 116, and (ii) an attention-based decoder recurrent neural network 118. CBHG is an acronym for Convolutions, Filter Banks and Highway layers, Gated Recurrent Units. Each character in the sequence of characters can be represented as a one-hot vector and embedded into a continuous vector. That is, the subsystem 102 can represent each character in the sequence as a one-hot vector and then generate an embedding, i.e., a vector or other ordered collection of numeric values, of the character before providing the sequence as input to the seq2seq network 106.

The encoder pre-net neural network 114 is configured to receive a respective embedding of each character in the sequence and process the respective embedding of each character to generate a transformed embedding of the character. For example, the encoder pre-net neural network 114 can apply a set of non-linear transformations to each embedding to generate a transformed embedding. In some cases, the encoder pre-net neural network 114 includes a bottleneck neural network layer with dropout to increase convergence speed and improve generalization capability of the system during training.

The encoder CBHG neural network 116 is configured to receive the transformed embeddings from the encoder pre-net neural network 206 and process the transformed embeddings to generate encoded representations of the sequence of characters. The encoder CBHG neural network 112 includes a CBHG neural network 200 (FIG. 2), which is described in more detail below with respect in FIG. 2. The use of the encoder CBHG neural network 112 as described herein may reduce overfitting. In addition, the encoder CBHG neural network 112 may result in fewer mispronunciations when compared to, for instance, a multi-layer RNN encoder.

The attention-based decoder recurrent neural network 118 (herein referred to as "the decoder neural network 118") is configured to receive a sequence of decoder inputs. For each decoder input in the sequence, the decoder neural network 118 is configured to process the decoder input and the encoded representations generated by the encoder CBHG neural network 116 to generate multiple frames of the spectrogram of the sequence of characters. That is, instead of generating (predicting) one frame at each decoder step, the decoder neural network 118 generates r frames of the spectrogram, with r being an integer greater than one. In many cases, there is no overlap between sets of r frames.

In particular, at decoder step t, at least the last frame of the r frames generated at decoder step t−1 is fed as input to the decoder neural network 118 at decoder step t+1 In some implementations, all of the r frames generated at the decoder step t−1 are fed as input to the decoder neural network 118 at the decoder step t+1. The decoder input for the first decoder step can be an all-zero frame (i.e. a <GO> frame). Attention over the encoded representations is applied to all decoder steps, e.g., using a conventional attention mechanism. The decoder neural network 118 may use a fully connected neural network layer with a linear activation to simultaneously predict r frames at a given decoder step. For example, to predict 5 frames, each frame being an 80-D (80-Dimension) vector, the decoder neural network 118 uses the fully connected neural network layer with the linear activation to predict a 400-D vector and to reshape the 400-D vector to obtain the 5 frames.

By generating r frames at each time step, the decoder neural network 118 divides the total number of decoder steps by r, thus reducing model size, training time, and inference time. Additionally, this technique substantially increases convergence speed, i.e., because it results in a much faster (and more stable) alignment between frames and encoded representations as learned by the attention mechanism. This is because neighboring speech frames are correlated and each character usually corresponds to multiple frames. Emitting multiple frames at a time step allows the decoder neural network 118 to leverage this quality to quickly learn how to, i.e., be trained to, efficiently attend to the encoded representations during training.

The decoder neural network 118 may include one or more gated recurrent unit neural network layers. To speed up convergence, the decoder neural network 118 may include one or more vertical residual connections. In some implementations, the spectrogram is a compressed spectrogram such as a mel-scale spectrogram. Using a compressed spectrogram instead of, for instance, a raw spectrogram may reduce redundancy, thereby reducing the computation required during training and inference.

The post-processing neural network 108 is configured to receive the compressed spectrogram and process the compressed spectrogram to generate a waveform synthesizer input. To process the compressed spectrogram, the post-processing neural network 108 includes the CBMG neural network 200 (FIG. 2) In particular, the CBHG neural network 200 includes a 1-D convolutional subnetwork, followed by a highway network, and followed by a bidirectional recurrent neural network. The CBHG neural network 200 may include one or more residual connections. The 1-D convolutional subnetwork may include a bank of 1-D convolutional filters followed by a max pooling along time layer with stride one. In some cases, the bidirectional recurrent neural net work is a Gated Recurrent Unit (GRU) recurrent neural network (RNN). The CBHG neural network 200 is described in more detail below with reference to FIG. 2.

In some implementations, the post-processing neural network 108 and the sequence-to-sequence recurrent neural network 106 are trained jointly. That is, during training, the system 100 (or an external system) trains the post-processing neural network 108 and the seq2seq network 106 on the same training dataset using the same neural network training technique, e.g., a gradient descent-based training technique. More specifically, the system 100 (or an external system) can backpropagate an estimate of a gradient of a loss function to jointly adjust the current values of all network parameters of the post-processing neural network 108 and the seq2seq network 106. Unlike conventional systems that have components that need to be separately trained or pre-trained and thus each component's errors can compound, systems that have the post-processing neural network 108 and seq2seq network 106 that are jointly trained are more robust (e.g., they have smaller errors and can be trained from scratch). These advantages enable the training of the end-to-end text-to-speech model 150 on a very large amount of rich, expressive yet often noisy data found in the real world.

The waveform synthesizer 110 is configured to receive the waveform synthesizer input, and process the waveform synthesizer input to generate a waveform of the verbal utterance of the input sequence of character s in the particular natural language. In some implementations, the waveform synthesizer is a Griffin-Lim synthesizer. In some other implementations, the waveform synthesizer is a vocoder. In some other implementations, the waveform synthesizer is a trainable spectrogram to waveform inverter. After the waveform synthesizer 110 generates the waveform, the subsystem 102 can generate speech 120 using the waveform and provide the generated speech 120 for playback, e.g., on a user device, or provide the generated waveform to another system to allow the other system to generate and play back the speech. In some examples, a WaveNet neural vocoder replaces the waveform synthesizer 110. A WaveNet neural vocoder may provide different audio fidelity of synthesized speech in comparison to synthesized speech produced by the waveform synthesizer 110.

Figure 2:
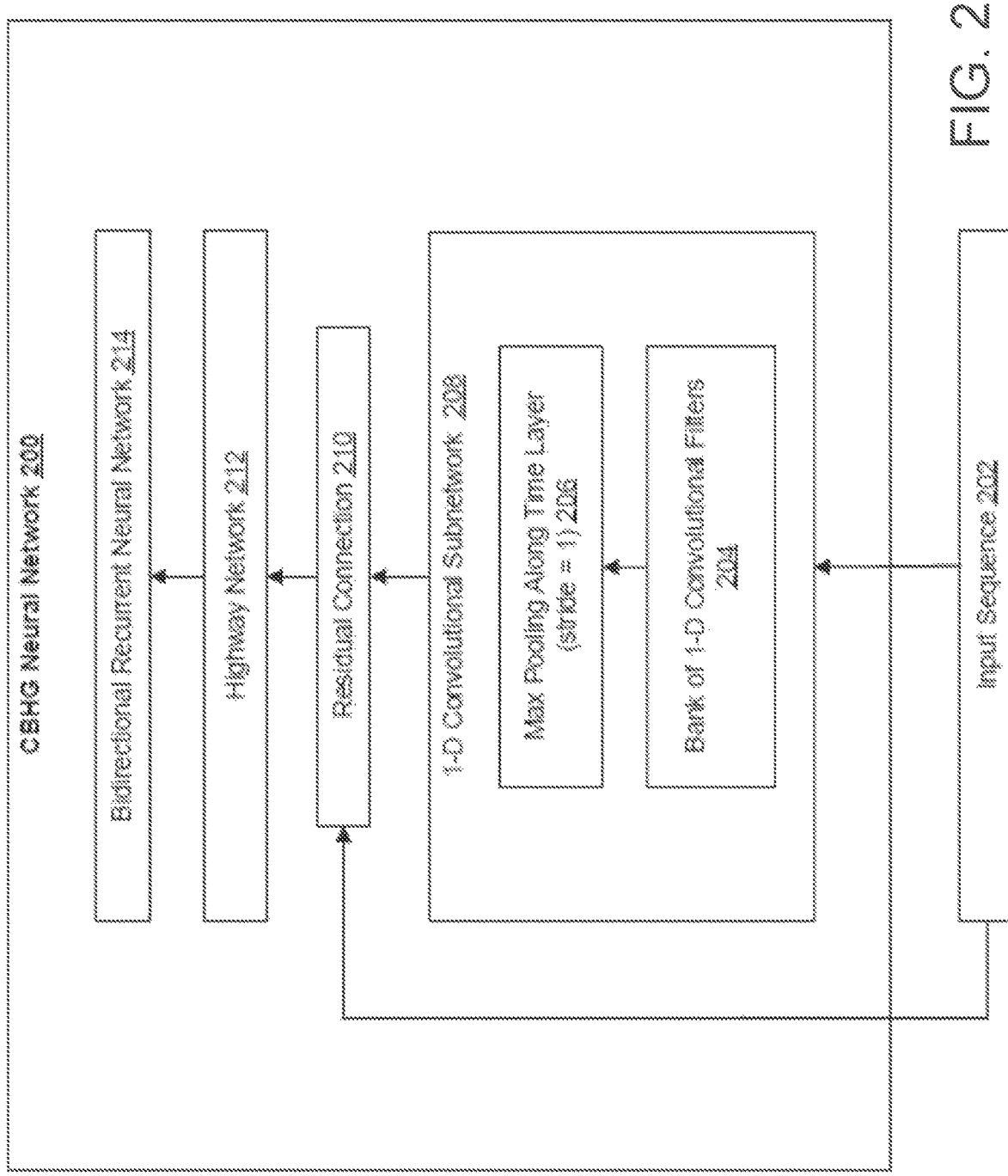
FIG. 2 is a schematic view of an example CBHG neural network.

FIG. 2 shows an example CBHG neural network 200. The CBHG neural network 200 can be the CBHG neural network included in the encoder CBHG neural network 116 or the CBHG neural network included in the post-processing neural network 108 of FIG. 1. The CBHG neural network 200 includes a 1-D convolutional subnetwork 208, followed by a highway network 212, and followed by a bidirectional recurrent neural network 214. The CBHG neural network 200 may include one or more residual connections, e.g., the residual connection 210.

The 1-D convolutional subnetwork 208 may include a bank of 1-D convolutional filters 204 followed by a max pooling along time layer with a stride of one 206. The bank of 1-D convolutional filters 204 may include K sets of 1-D convolutional filters, in which the k-th set includes $C_k$ filters each having a convolution width of k. The 1-D convolutional subnetwork 208 is configured to receive an input sequence 202, for example, transformed embeddings of a sequence of characters that are generated by an encoder pre-net neural network 114 (FIG. 1). The subnetwork 208 processes the input sequence 202 using the bank of 1-D convolutional filters 204 to generate convolution outputs of the input sequence 202. The subnetwork 208 then stacks the convolution outputs together and processes the stacked convolution outputs using the max pooling along time layer with stride one 206 to generate max-pooled outputs. The subnetwork 208 then processes the max-pooled outputs using one or more fixed-width 1-D convolutional filters to generate subnetwork outputs of the subnetwork 208.

After the 1-D convolutional subnetwork 208 generates the subnetwork outputs, the residual connection 210 is configured to combine the subnetwork outputs with the original input sequence 202 to generate convolution outputs. The highway network 212 and the bidirectional recurrent neural network 214 are then configured to process the convolution outputs to generate encoded representations of the sequence of characters. In particular, the highway network 212 is configured to process the convolution outputs to generate high-level feature representations of the sequence of characters. In some implementations, the highway network includes one or more fully-connected neural network layers.

The bidirectional recurrent neural network 214 is configured to process the high-level feature representations to generate sequential feature representations of the sequence of characters. A sequential feature representation represents a local structure of the sequence of characters around a particular character. A sequential feature representation may include a sequence of feature vectors. In some implementations, the bidirectional recurrent neural network is a gated recurrent unit neural network.

During training, one or more of the convolutional filters of the 1-D convolutional subnetwork 208 can be trained using batch normalization method, which is described in detail in S. Ioffe and C. Szegedy, "Batch normalization: Accelerating deep network training by reducing internal covariate shift," arXiv preprint arXiv: 1502.03167, 2015. In some implementations, one or more convolutional fillers in the CBHG neural network 200 are non-causal convolutional filters, i.e., convolutional filters that, at a given time step T, can convolve with surrounding inputs in both directions (e.g., T−1, T−2 and T+1, T+2, . . . etc.). In contrast, a causal convolutional filter can only convolve with previous inputs ( . . . T−1, T−2, etc.). In some other implementations, all convolutional filters in the CBHG neural network 200 are non-causal convolutional filters. The use of non-causal convolutional filters, batch normalization, residual connections, and max pooling along time layer with stride one improves the generalization capability of the CBHG neural network 200 on the input sequence and thus enables the text-to-speech conversion system to generate high-quality speech.

Figure 3:
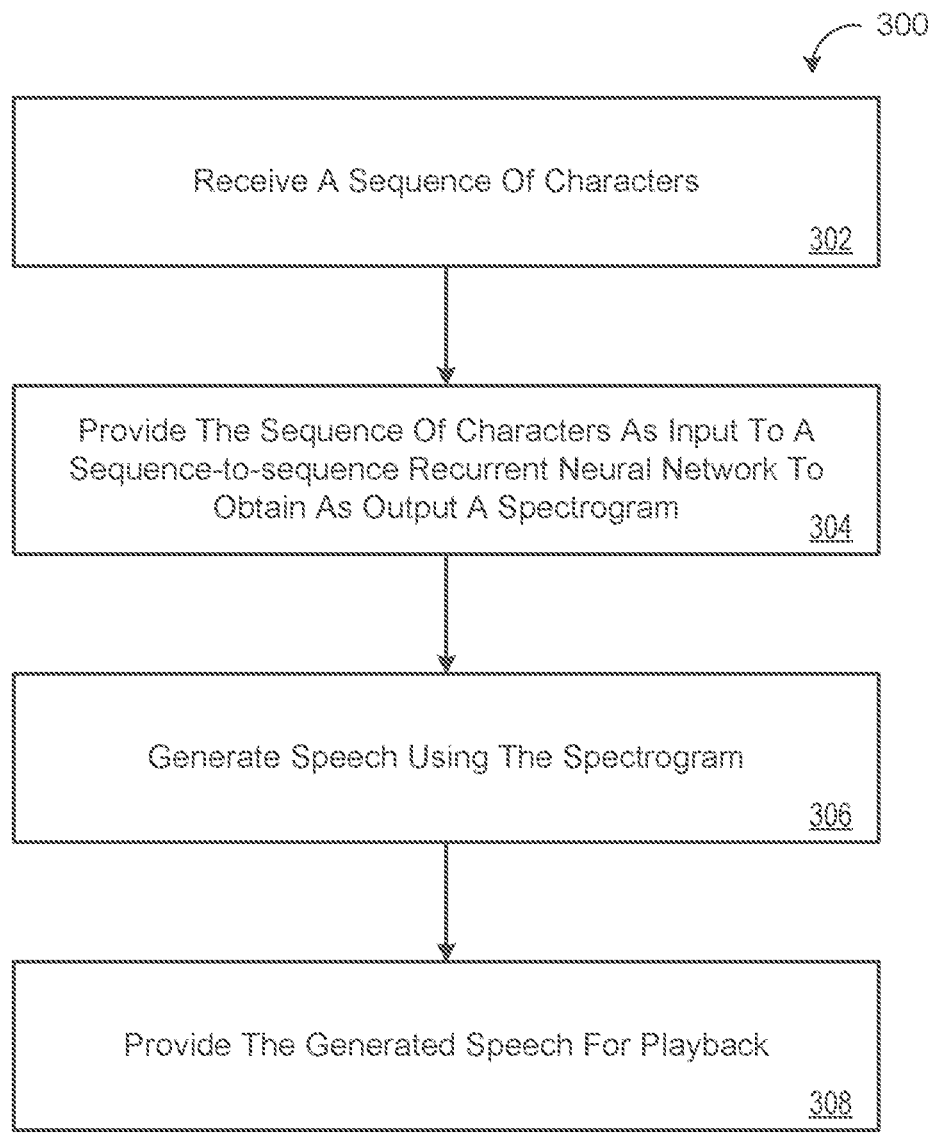
FIG. 3 is an example arrangement of operations for synthesizing speech from input text.

FIG. 3 is an example arrangement of operations for a method 300 of generating speech from a sequence of characters. For convenience, the method 300 will be described as being performed by a system of one or more computers located in one or more locations. For example, a text-to-speech conversion system (e.g., the text-to-speech conversion system 100 of FIG. 1) or a subsystem of a text-to-speech conversion system (e.g., the subsystem 102 of FIG. 1), appropriately programmed, can perform the method 300.

At operation 302, the method 300 includes the system receiving a sequence of characters in a particular natural language, and at operation 304, the method 300 includes the system providing the sequence of characters as input to a sequence-to-sequence (seq2seq) recurrent neural network 106 to obtain as output a spectrogram of a verbal utterance of the sequence of characters in the particular natural language. In some implementations, the spectrogram is a compressed spectrogram, e.g., a mel-scale spectrogram. In particular, the seq2seq recurrent neural network 106 processes the sequence of characters to generate a respective encoded representation of each of the characters in the sequence using an encoder neural network 112 that includes an encoder pre-net neural network 114 and an encoder CBHG neural network 116.

More specifically, each character in the sequence of characters can be represented as a one-hot vector and embedded into a continuous vector. The encoder pre-net neural network 114 receives a respective embedding of each character in the sequence and processes the respective embedding of each character in the sequence to generate a transformed embedding of the character. For example, the encoder pre-net neural network 114 can apply a set of non-linear transformations to each embedding to generate a transformed embedding. The encoder CBHG neural network 116 then receives the transformed embeddings from the encoder pre-net neural network 114 and processes the transformed embeddings to generate the encoded representations of the sequence of characters.

To generate a spectrogram of a verbal utterance of the sequence of characters, the seq2seq recurrent neural network 106 processes the encoded representations using an attention-based decoder recurrent neural network 118. In particular, the attention-based decoder recurrent neural network 118 receives a sequence of decoder inputs. The first decoder input in the sequence is a predetermined initial frame. For each decoder input in the sequence, the attention-based decoder recurrent neural network 118 processes the decoder input and the encoded representations to generate r frames of the spectrogram, in which r is an integer greater than one. One or more of the generated r frames can be used as the next decoder input in the sequence. In other words, each other decoder input in the sequence is one or more of the r frames generated by processing a decoder input that precedes the decoder input in the sequence.

The output of the attention-based decoder recurrent neural network thus includes multiple sets of frames that form the spectrogram, in which each set includes r frames. In many cases, there is no overlap between sets of r frames. By generating r frames at a time, the total number of decoder steps performed by the attention-based decoder recurrent neural network is reduced by a factor of r, thus reducing training and inference time. This technique also helps to increase convergence speed and learning rate of the attention-based decoder recurrent neural network and the system in general.

At operation 306, the method 300 includes generating speech using the spectrogram of the verbal utterance of the sequence of characters in the particular natural language. In some implementations, when the spectrogram is a compressed spectrogram, the system can generate a waveform from the compressed spectrogram and generate speech using the waveform.

At operation 308, the method 300 includes providing the generated speech for playback. For example, the method 300 may provide the generated speech for playback by transmitting the generated speech from the system to a user device (e.g., audio speaker) over a network for playback.

Figure 4:
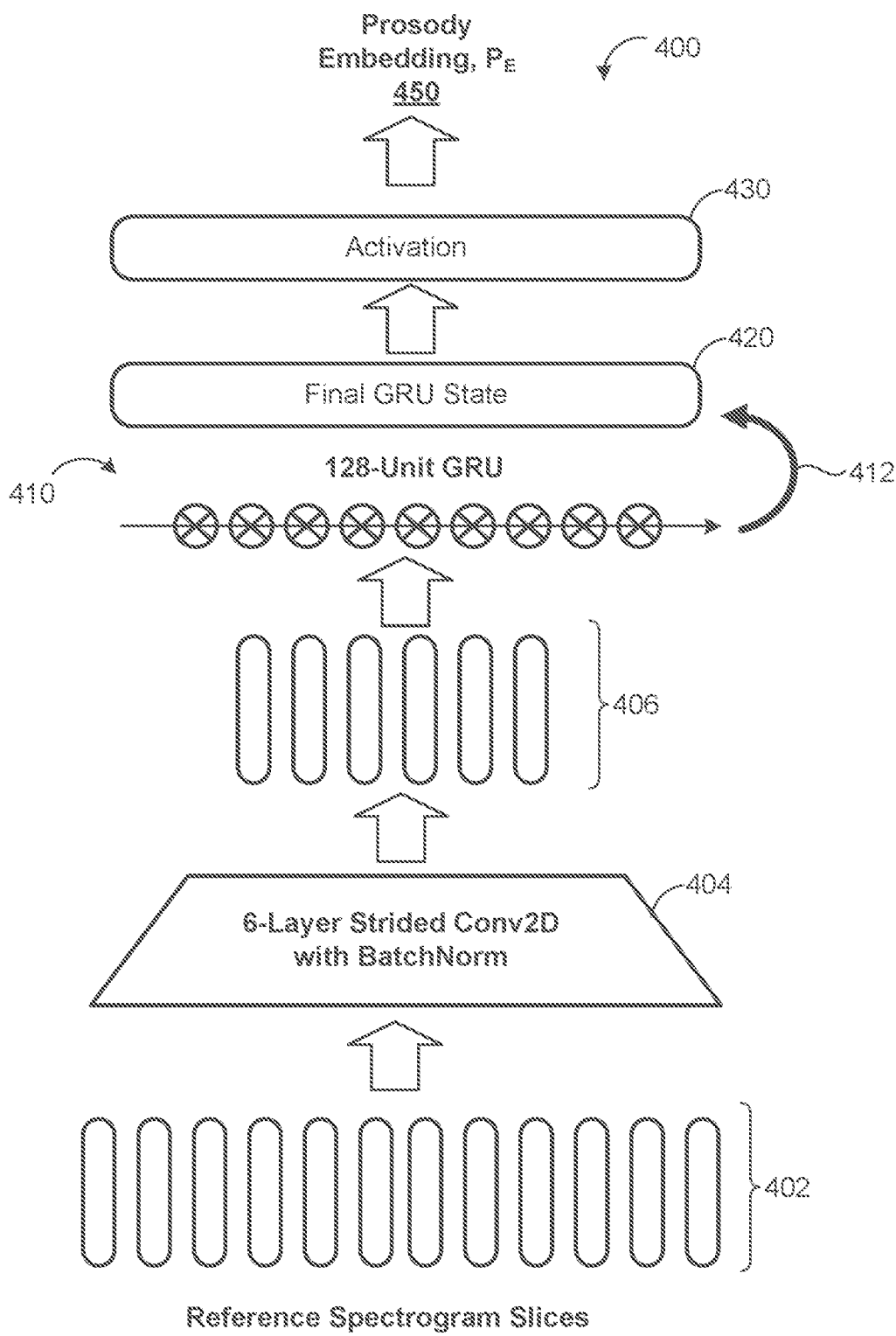
FIG. 4 is a schematic view of an example deterministic reference encoder for producing a prosody embedding.

FIG. 4 shows a deterministic reference encoder 400 disclosed by "Towards End-to-End Prosody Transfer for Expressive Speech Synthesis with Tacotron", arXiv preprint arXiv. 1803.09047, Mar. 24, 2018, the contents of which are incorporated by reference in their entirety. In some implementations, the reference encoder 400 is configured to receive a reference audio signal 402 and generates/predicts a fixed-length prosody embedding $P_E$ 450 (also referred to as 'prosodic embedding') from the reference audio signal 402. The prosody embedding $P_E$ 450 may capture characteristics of the reference audio signal 402 independent of phonetic information and idiosyncratic speaker traits such as, stress, intonation, and timing. The prosody embedding $P_E$ 450 may used as an input for preforming prosody transfer in which synthesized speech is generated for a completely different speaker than the reference speaker, but exhibiting the prosody of the reference speaker.

In the example shown, the reference audio signal 402 may be represented as spectrogram slices having a length $L_R$ and dimension $D_R$. The spectrogram slices associated with the reference audio signal 402 may be indicative of a Mel-warped spectrum. In the example shown, the reference encoder 400 includes a six-layer convolutional layer network 404 with each layer including 3×3 filters with 2×2 stride, SAME padding, and ReLU activation. Batch normalization is applied to every layer and the number of filters in each layer doubles at half the rate of downsampling: 32, 32, 64, 128, 128. A recurrent neural network 410 with a single 128-width Gated Recurrent Unit (GRU-RNN) layer receives the output 406 from the last convolutional layer and outputs a 128-dimensional output 412 applied to a fully connected layer 420 followed by an activation function 430 that outputs the predicted prosody embedding $P_E$ 450. The recurrent neural network 410 may include other types of bidirectional recurrent neural networks.

The choice of activation function 430 (e.g., a softmax or tanh) in reference encoder 400 may constrain the information contained in the prosody embedding $P_E$ 450 and help facilitate learning by controlling the magnitude of the prosody embedding $P_E$ 450. Moreover, the choice of the length $L_R$ and the dimension $D_R$ of the reference audio signal 402 input to the reference encoder 400 impacts different aspects of prosody learned by the encoder 400. For instance, a pitch track representation may not permit modeling of prominence in some language since the encoder does not contain energy information, while a Mel Frequency Cepstral Coefficient (MFCC) representation may, at least to some degree depending on the number of coefficients trained, prevent the encoder 400 from modeling intonation.

Figure 5A:
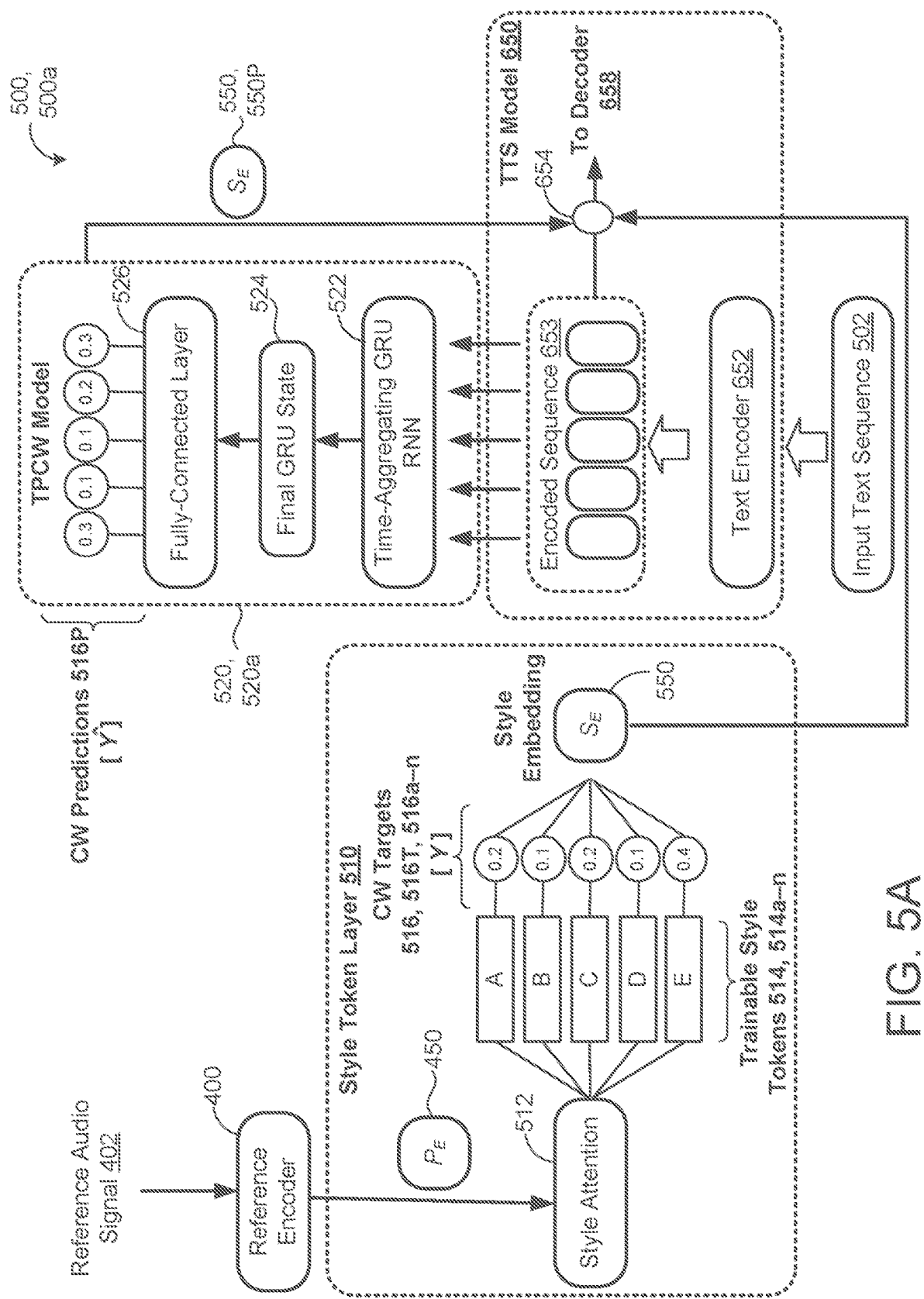
FIGS. 5A and 5B are schematic views of an example text-prediction system.
Figure 5B:
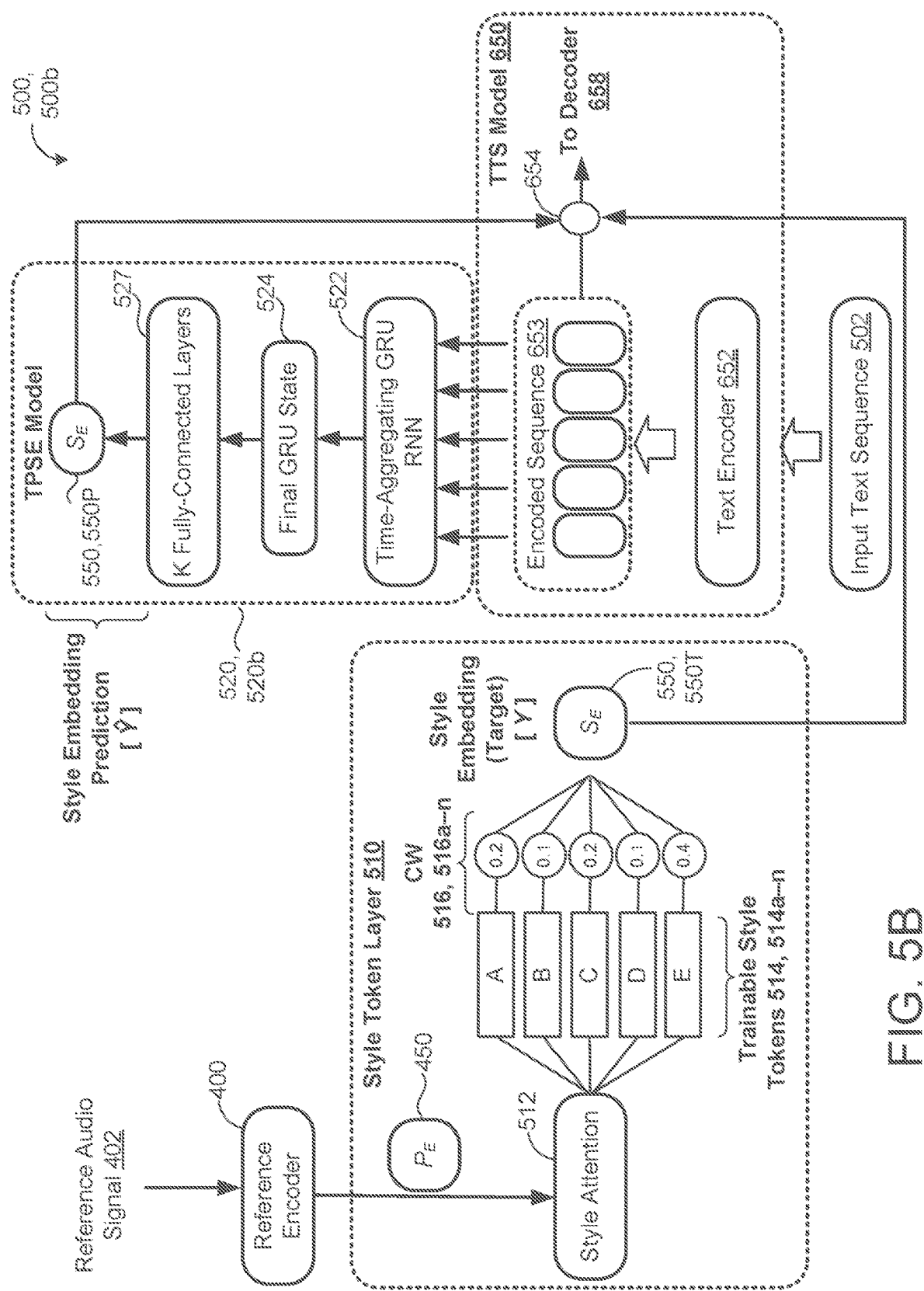

While the prosody embedding $P_E$ 450 output from the reference encoder 400 can be used in a multitude of different TTS architectures for producing synthesized speech, a seed signal (e.g., reference audio signal 402) is required for producing the prosody embedding $P_E$ 450 at inference time. For instance, the seed signal could be a "Say it like this" reference audio signal 402. Alternatively, to convey synthesized speech with an intended prosody/style, some TTS architectures can be adapted to use a manual style embedding selection at inference time instead of using the reference encoder 400 to output a prosody embedding $P_E$ 450 from a seed signal. Referring to FIGS. 5A and 5B, in some implementations, a text-prediction system 500, 500a-b is configured to predict, without a seed signal (e.g., reference audio signal 402) or a manual style embedding selection at inference, a style embedding $S_E$ 550 from input text 502, and provide the predicted style embedding $S_E$ 550 to an end-to-end TTS model 650 for converting the input text 502 into synthesized speech 680 (FIGS. 6A and 6B) having a style/prosody specified by the style embedding $S_E$ 550. That is to say, the text-prediction system 500 uses the input text 502 as a source of context to predict a speaking style for expressive speech 680 synthesized by the TTS model 650 without relying on auxiliary inputs at inference time.

During training, the text-prediction system 500 of FIGS. 5A and 5B includes a reference encoder 400, a style token layer 510, a text-prediction model 520, 520a-b, and the end-to-end TTS model 650. The text-prediction model 520 may also be referred to as a text-prediction network 520. The reference encoder 400 may include the reference encoder 400 described above with reference to FIG. 4. In the example shown, the reference encoder 400 is configured to output a prosody embedding $P_E$ 450 from a reference audio signal 402 and provide the prosody embedding $P_E$ 450 to the style token layer 510 for generating a style embedding $S_E$ 550 that conveys prosody and/or style information associated with the reference audio signal 402. A transcript of the reference audio signal 402 matches the sequence of characters of input text 502 (also referred to as 'input text sequence') input to a text encoder 652 of the TTS model 650 so that a resulting output audio signal 670 (FIGS. 6A and 6B) output from a decoder 658 will match the reference audio signal 402. Additionally, the text-prediction model 520 also uses the text encoder 652 to receive each training sample of input text 502 corresponding to the transcript of the reference audio signal 402 for predicting combination weights (CW) 516P (FIG. 5A) associated with the style embedding $S_E$ 550 generated by the style token layer 510 or for directly predicting a style embedding $S_E$ 550P (FIG. 5B) that matches the style embedding $S_E$ 550 generated by the style token layer 510. Thus, the training stage uses a training set of reference audio signals 402 (e.g., ground truth) and corresponding transcripts of input text 502 to permit joint training of the text-prediction model 520, to predict a style embedding $S_E$ 550P for each training sample of input text 502, and the TTS model 650, to determine (via the decoder 658) the output audio signal 670 having a style/prosody specified by a target style embedding $S_E$ 550T and matching the training sample of the reference audio signal 402.

In some implementations, the style token layer 510 includes the style token layer disclosed by "Style Tokens. Unsupervised Style Modeling, Control and Transfer in End-to-End Speech Synthesis", arXiv preprint arXiv: 1803.09017, Mar. 23, 2018, the contents of which are incorporated by reference in their entirety. The style token layer 510 includes a style attention module 512 configured to learn in an unsupervised manner, during training, a convex combination of trainable style tokens 514, 514a-n that represent the prosody embedding $P_E$ 450 output from the reference encoder 400. Here, the style token layer 510 uses the prosody embedding $P_E$ 450 as a query vector to the attention module 512 configured to learn a similarity measure between the prosody embedding and each style token 514 in a bank of randomly initialized style token 514, 514a-n. The style tokens 514 (also referred to as 'style embeddings') may include corresponding embeddings shared across all training sequences. Thus, the attention module 512 outputs a set of combination weights 516, 516a-n that represent the contribution of each style token 514 to the encoded prosody embedding $P_E$ 450. The attention module 512 may determine the combination weights 516 by normalizing the style tokens 514 via a softmax activation. The resulting style embedding $S_E$ 550 output from the style token layer 510 corresponds to the weighted sum of the style tokens 514. Each style token 514 may include a dimensionality that matches a dimensionality of a state of the text encoder 502. While the examples show the style token layer 510 including five (5) style tokens 514, the style token layer 510 may include any number of style tokens 514. In some examples, ten (10) style tokens 514 is selected to provide a rich variety of prosodic dimensions in the training data.

In some configurations, the style token layer 510 is trained jointly with the TTS model 650 and the text-prediction model 520. In other configurations, the style token layer 510 and the TTS model 650 are trained separately, while the style token layer 510 and the text-prediction model 520 are trained jointly.

With continued reference to FIGS. 5A and 5B, the text-prediction networks 520 each receive, as input, an encoded sequence 653 output from the text encoder 652 of the TTS model 650. Here, the encoded sequence 653 corresponds to an encoding of the input text sequence 502. In some examples, the text encoder 652 includes the CBHG neural network 200 (FIG. 2) to encode the input text sequence 502 into a variable-length encoded sequence 653 to explicitly model local and contextual information in the input text sequence 502. The input text sequence 502 may include phoneme inputs produced by a text normalization front-end and lexicon since prosody is being addressed, rather than the model's ability to learn pronunciation from graphemes. The text-prediction networks 520 includes a bidirectional RNN 522, such as a 64-unit time-aggregating GRU-RNN 522, that functions as a summarizer for the text encoder 502 similar to how the 128-unit GRU-RNN 410 (FIG. 4) functions as a summarizer for the reference encoder 400 by time-aggregating a variable-length input (e.g., the encoded sequence 553) into a fixed-length (e.g., 64-dimensional) output 524. Here, the fixed-length output 524 corresponds to a fixed-length text feature vector, i.e., fixed-length text features 524.

The text-prediction networks 520a, 520b provide two text-prediction pathways for predicting style embeddings 550 during inference based on input text 502. Each of these networks 520a, 520b may be trained jointly by using operators configured to stop gradient flow. Referring to FIG. 5A, the text-prediction model 520a provides a first text prediction pathway to predict style tokens 514 learned during training by using combination weights 516, 516P predicted from the input text sequence 502. The text-prediction model 520a may be referred to as a text-prediction combination weight (TPCW) model 520a. During a training stage in which the model 520a is trained unsupervised, the model 520a sets the combination weights 516 determined by the style token layer 510 as a prediction target and then feeds the fixed-length text features 524 output from the time-aggregating GRU-RNN 522 to a fully connected layer 526. Thus, the combination weights 516, 516T may be referred to as target combination weights (CW) 516T. Since backpropagation can update the style attention module 512 and the style tokens 514, the combination weights 516T may form moving targets during the training stage. In some examples, the fully connected layer 526 is configured to output logits corresponding to the predicted combination weights 516P to allow the model 520a to determine a cross-entropy loss between the predicted combination weights 516P and the target combination weights 516T output from the style token layer 510. Through interpolation, the style embedding $S_E$ 550 can be predicted from these predicted combination weights 516P. Thereafter, the model 520a may be configured to stop gradient flow to prevent backpropagation of airy text prediction error through the style token layer 510. Moreover, the cross-entropy loss can be added to the final loss of the TTS model 650 during training.

With continued reference to FIG. 5A, during an inference stage, the style tokens 514 are fixed and the text-prediction model 520a (TPCW model 520a; is configured to predict the combination weights 516P based on an input text sequence 502 alone. Here, the input text sequence 502 corresponds to current input text the TTS model 650 is to synthesize into expressive speech. Accordingly, the text encoder 652 encodes the input text sequence 502 into an encoded sequence 653 and provides the encoded sequence 653 to both a concatenator 654 of the TTS model 650 and the text-prediction model 520a for predicting the combination weights 516P. Here, the model 520a may use the predicted combination weights 516P to determine the predicted style embedding $S_E$ 550P and provide the predicted style embedding $S_E$ 550P to the concatenator 654 of the TTS model 650. In some examples, the concatenator 654 concatenates the encoded sequence 653 output front the text encoder 652 and the predicted style embedding $S_E$ 550P, and provides the concatenation to the decoder 658 of the TTS model 650 for conversion into synthesized speech 680 having a style/prosody specified by the predicted style embedding $S_E$.

Referring to FIG. 5B, the text-prediction model 520b ignores the style tokens 514 and combination weights 516 learned during training and directly predicts the style embedding $S_E$ 550 from the input text sequence 502. The text-prediction model 520b may be referred to as a text-prediction style embedding (TPSE) model 520b During a training stage in which the model 520b is trained in an unsupervised manner (and also jointly with the model 520a of FIG. 5A), the model 520b sets the style embedding $S_E$ 550, 550T as a prediction target and feeds the fixed-length text features 524 output from the time-aggregating GRU-RNN 522 to one or more fully-connected layers 527 to output the predicted style embedding $S_E$ 550, 550P. In some examples, the fully-connected layers 527 include one or more hidden fully-connected layers that use ReLU activations and an output layer that uses tanh activation to emit the text-predicted style embedding $S_E$ 550P. In some examples, the tanh activation applied by the output layer is chosen to match a tanh activation of a final bidirectional GRU-RNN (e.g., bidirectional RNN 214 of the CBHG neural network 200 of FIG. 2) of the text encoder 652. Similarly, this tanh activation may match a style token tanh activation used by the attention style module 512 of the style token layer 510.

In some implementations, the text-prediction model 520 determine an $L_1$ loss between the predicted style embedding $S_E$ 550P and the target style embedding $S_E$ 550T output front the style token layer 510. Thereafter, the model 520b may be configured to stop gradient flow to prevent backpropagation of any text prediction error through the style token layer 510. Moreover, the cross-entropy loss can be added to the final loss of the TTS model 650 during training.

With continued reference to FIG. 5B, during an inference stage, the text-prediction model 520b (TPSE model 520b) ignores the style token layer 510 and directly predicts the style embedding $S_E$ 550P based on an input text sequence 502 alone. As with the TPCW model 520a of FIG. 5A, the input text sequence 502 corresponds to current input text the TTS model 650 is to synthesize into expressive speech. Accordingly, the text encoder 652 encodes the input text sequence 502 into an encoded sequence 653 and provides the encoded sequence 653 to both a concatenator 654 of the TTS model 650 and the text-prediction model 520b for predicting the style embedding $S_E$ 550P. Alter predicting the style embedding $S_E$ 550P, the system 520b provides the predicted style embedding $S_E$ 550P to the concatenator 654 of the TTS model 650. In some examples, the concatenator 654 concatenates the encoded sequence 653 output from the text encoder 652 and the predicted style embedding $S_E$ 550P, and provides the concatenation to the decoder 658 of the TTS model 650 for conversion into synthesized speech 680 having a style/prosody specified by the predicted style embedding $S_E$.

Figure 6A:
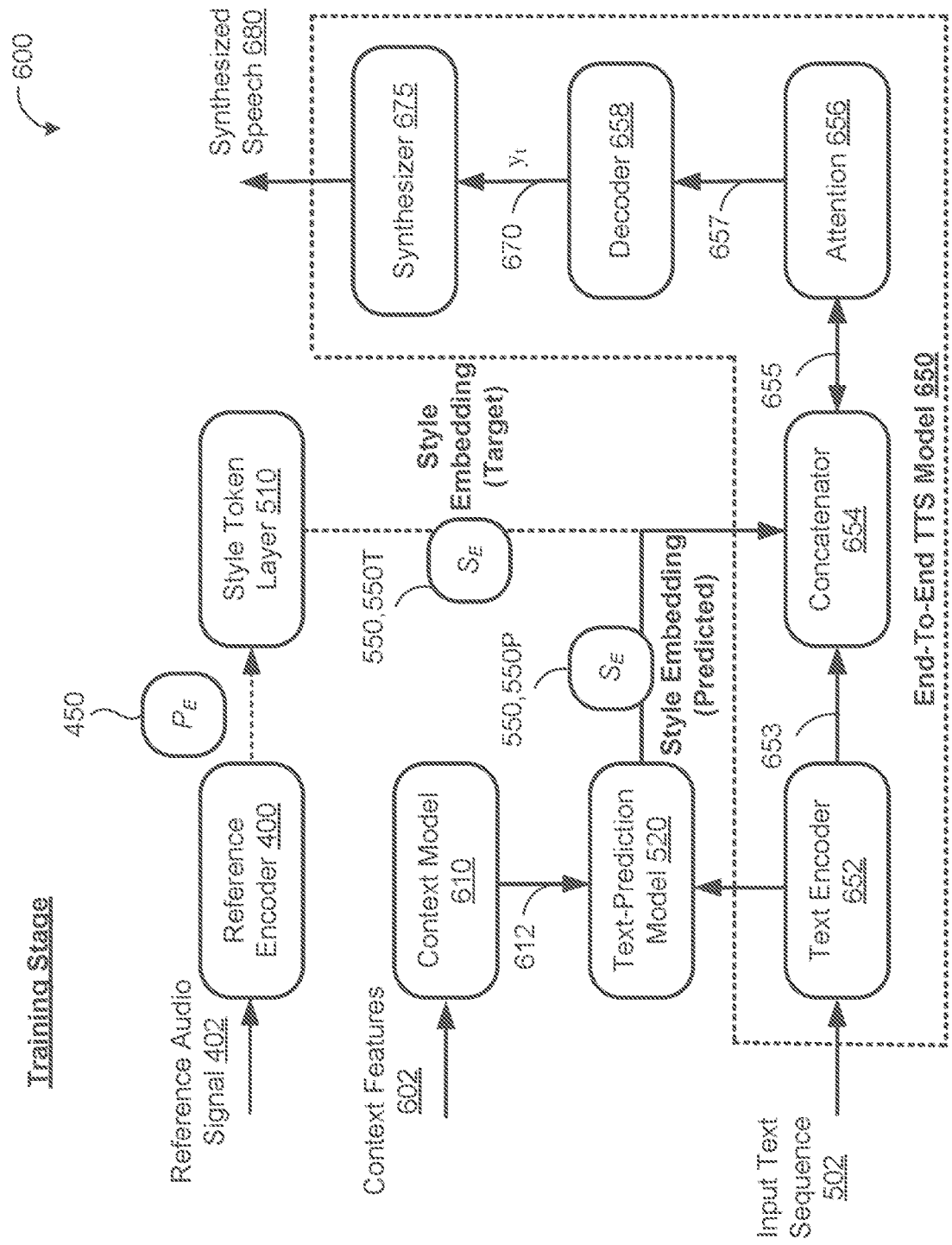
FIGS. 6A and 6B are schematic views of an example context-prediction system.
Figure 6B:
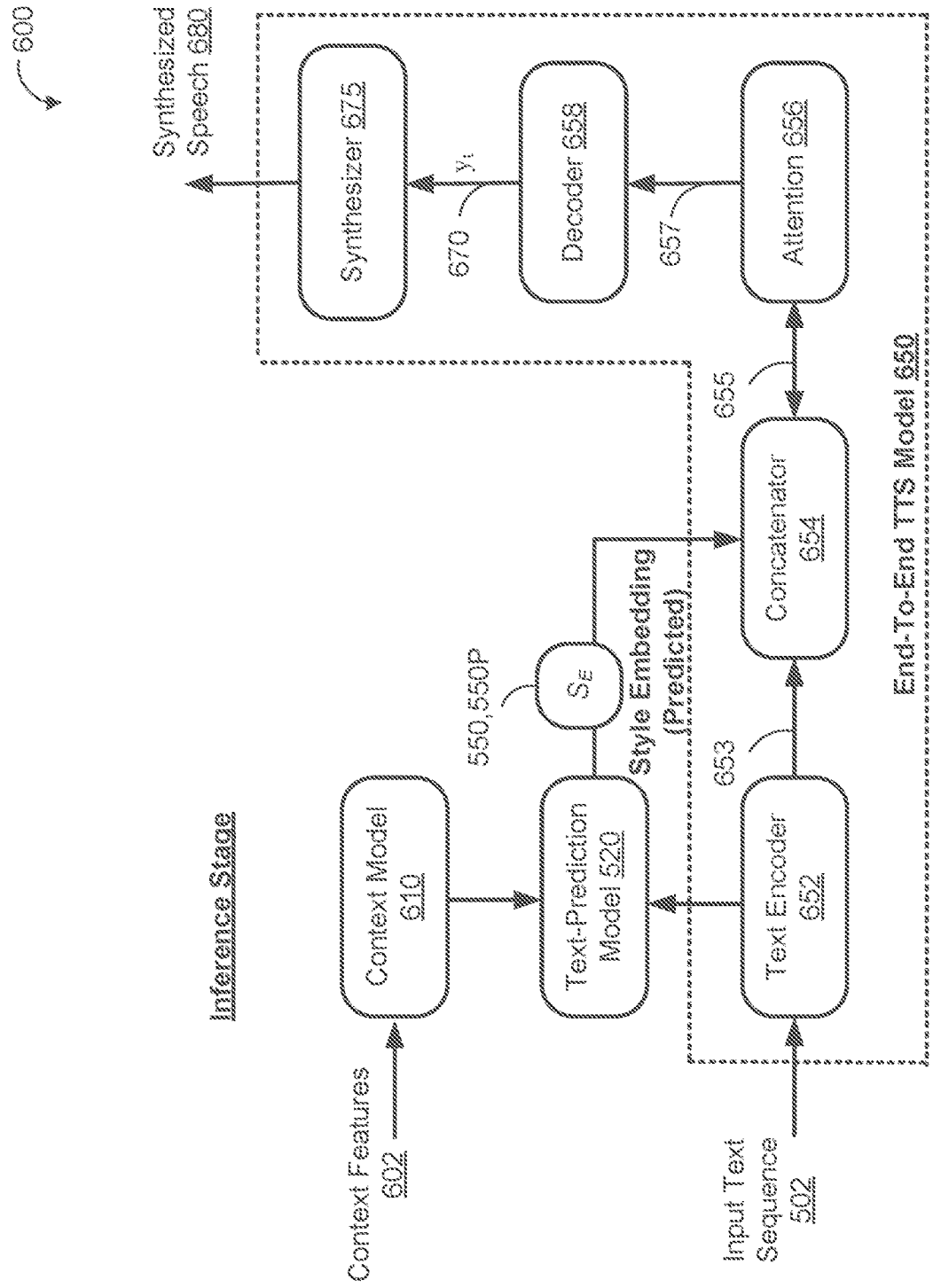

FIGS. 6A and 6B include training (FIG. 6A) and inference (FIG. 6B) stages of a context-prediction system 600 configured to predict, without a seed signal (e.g., reference audio signal 402) or a manual style embedding selection at inference, a style embedding $S_E$ 550 from input text 502 and one or more context features 602 associated with the input text 502. As with the text-prediction system 500 of FIGS. 5A and 5B, the predicted style embedding $S_E$ 550 is fed from the text-prediction network 520 to the end-to-end TTS model 650 for converting the input text 502 into an output audio signal 670 having a style/prosody specified by the style embedding $S_E$ 550. The system 600 may execute on data processing hardware 910 (FIG. 9) using instructions stored on memory hardware 920 (FIG. 9) in the example shown, the system 600 includes a context model 610, the reference encoder 400, the text-prediction network 520 in communication with the context model 610, and the TTS model 650 in communication with the text-prediction model 520.

Generally, the context model 610 is configured to receive and process the one or more context features 602 to generate a context embedding 612 associated with the current input text 502. The current input text 502 refers to a sequence of characters to be synthesized into expressive speech 680. The current input text 502 could be a single sentence in some examples, while in other examples, the current input text 502 includes a paragraph. The sequence of characters in the current input text 502 and the resulting synthesized expressive speech 680 of the current input text 502 are associated with a particular language. Moreover, each context features 602 may be derived from a text source 800 (FIG. 8) of the current input text 502, whereby the text source 800 includes sequences of text to be synthesized into expressive speech 680.

The text-prediction model 520 may include the text-prediction models 520 described above with reference to FIGS. 5A and 5B. As used herein, the terms "text-prediction model" and "text-prediction network" are used interchangeably. However, by contrast to FIGS. 5A and 5B, the system 600 may modify the text-prediction model 520 to receive, as input, in addition to the current input text 502, the context embedding 612 generated by the context model 610 based on the one or more context features 602 associated with the current input text 502. Thereafter, the text-prediction model 520 of the context-prediction system 600 is configured to process the current input text 502 and the context embedding 612 associated with the current input text 502 to predict, as output, the style embedding $S_E$ 550, 550P for the current input text 502. As described above with reference to FIG. 5A, the text-prediction model 520 may be configured to predict combination weights 516P representing a contribution of a set of style tokens 514 such that the predicted style embedding $S_E$ 550P can be interpolated based on a weighted sum of the style tokens 514. On the other hand, as described above with reference to FIG. 5B, the text-prediction model 520 may be configured to directly predict the style embedding $S_E$ 550P from the current input text 502 and the context embedding 612. Regardless of whether the style embedding $S_E$ 550P is predicted by the text-prediction model 520 via interpolation or directly, the style embedding $S_E$ 550P is predicted without using a seed signal (e.g., reference audio signal 402) or manual style embedding selection at inference.

In some examples, the TTS model 650 is configured to receive the current input text 502 (e.g., from the text source 800), receive the style embedding $S_E$ 550P predicted by the text-prediction model 520, and process the input text 502 and the style embedding $S_E$ 550P to generate the output audio signal 670 of expressive speech of the current input text 502. Here, the output audio signal 670 has a specific prosody and style specified by the style embedding $S_E$ 550.

The TTS model 650 includes the encoder 652, a concatenator 654, an attention module 656, the decoder 658, and a synthesizer 475. In some implementations, the TTS model 650 includes the TTS model 150 of FIG. 1. For instance, the encoder 652, the attention module 656, and the decoder 658 may collectively correspond to the seq2seq recurrent neural network 106 and the synthesizer 675 may include the waveform synthesizer 110 or a WaveNet neural vocoder. However, the choice of synthesizer 675 has no impact on the resulting prosody and/or style of the synthesized speech 680, and in practice, only impacts audio fidelity of the synthesized speech 680. The attention module 656 may include Gaussian Mixture Model (GMM) attention to improve generalization to long utterances. Accordingly, the encoder 652 of the TTS model 650 may use a CBHG neural network 200 (FIG. 2) to encode the input text 502 into an encoded sequence 653 that is fed to the concatenator 654. The predicted style embedding $S_E$ 550P output from the text-prediction model 520 is also fed to the concatenator 654 and the concatenator 654 is configured to generate a concatenation 655 between the respective encoded sequence 653 of the current input text 502 and the style embedding $S_E$ 550P. In some examples, the concatenator 654 includes a broadcast concatenator. In some implementations, the attention module 656 is configured to convert the concatenation 655 to a fixed-length context vector 657 for each output step of the decoder 658 to produce the output audio signal 670, $y_t$.

The input text 502 may include phoneme inputs produced by a text normalization front-end and lexicon since prosody is being addressed, rather than the model's ability to learn pronunciation front graphemes. However, the input text 502 may additionally or alternatively include grapheme inputs. The attention model 656 and the decoder 658 may collectively include the attention-based decoder recurrent neural network 118 (FIG. 1) and use a reduction factor equal to two (2), thereby producing two spectrogram frames (e.g., output audio signal 670) per timestep. In some examples, two layers of 256-cell long short term memory (LSTM) using zoneout with probability equal to 0.1 may replace GRU cells of the decoder 658. In other implementations, the TTS model 650 includes the speech synthesis system disclosed in U.S. application Ser. No. 16/058,640, filed on Aug. 8, 2018, the contents of which are incorporated by reference in their entirety.

During the training stage, FIG. 6A shows the context-prediction system 600 including the reference encoder 400 configured to output a prosody embedding $P_E$ 450 from a reference audio signal 402 and provide the prosody embedding $P_E$ 450 to the style token layer 510 for generating a style embedding $S_E$ 550, 550T that conveys prosody and/or style information associated with the reference audio signal 402. The reference encoder 400 and the style token layer 510 are described above with reference to FIGS. 5A and 5B. A transcript of the reference audio signal 402 matches the sequence of characters of input text 502 (also referred to as 'input text sequence') input to the text encoder 652 so that a resulting output audio signal 670, yt output from the decoder 658 will match the reference audio signal 402. In one example, reference audio signal 402 may include a speaker reading a text document (e.g., text source) and the corresponding transcripts of input text 502 correspond to text/sentences in the text document the speaker is reading from.

The context features 602 are derived from the text source 800 of the current input text 502, wherein the context model 610 is configured to generate a context embedding 612 associated with the current input text 502 by processing the context features 602 and feed the context embedding 612 to the text-prediction model 520. For instance, in the above example, the context features 602 are derived from the text document, and may include, without limitation, the current input text 502 ($T_t$) to be synthesized, previous text ($T_{t-1}$) from the text source that precedes the current input text, previous speech synthesized 680 (e.g., previous output audio signal 670 ($y_{t-1}$) from the previous text, upcoming text ($T_{t+1}$) from the text source that follows the current input text, a previous style embedding predicted by the text-prediction network 520 based on the previous text and a previous context embedding associated with the previous text. Additionally, the one or more context features 602 derived from the text document may include at least one of: a title of the text document; a title of a chapter in the text document; a title of a section in the text document, a headline in the text document; one or more bullet points in the text document, entities from a concept graph extracted from the text document, or one or more structured answer representations extracted from the text document. In some examples, the context features 602 associated with text (e.g., current input text, previous text, upcoming text, etc.) include features extracted from the text that may include, without limitation, vowel-level embeddings, word-level embeddings, sentence-level embeddings, paragraph-level embeddings, and/or speech tags (e.g., noun, verb, adjective, etc.) for each word.

Additionally, the text-prediction model 520 receives each training sample of input text 502 corresponding to the transcript of the reference audio signal 402 and the corresponding context embedding 612 generated for each training sample of input text 502 for predicting combination weights (CW) 516P (FIG. 5A) associated with the style embedding $S_E$ 550 generated by the style token layer 510 or for directly predicting a style embedding $S_E$ 550P (FIG. 5B) that matches the style embedding $S_E$ 550 generated by the style token layer 510. Thus, the training stage uses a training set of reference audio signals 402 (e.g., ground truth), corresponding transcripts of input text 502, and context features 602 derived from the transcripts of input text 502 to permit joint training of the context model 610 and the text-prediction model 520, to predict a style embedding $S_E$ 550P for each training sample of input text 502 and the TTS model 650, to determine (via the decoder 658) the output audio signal 670 having a style/prosody specified by a target style embedding $S_E$ 550T and matching the training sample of the reference audio signal 402. However, in some configurations, the training stage instead includes a two-step training procedure in which the reference encoder 400, style token layer 510, and TTS model 650 are pre-trained and frozen during a first step of the training procedure, while the context model 610 and the text-prediction model 520 are trained separately during a second step of the training procedure.

Figure 8:
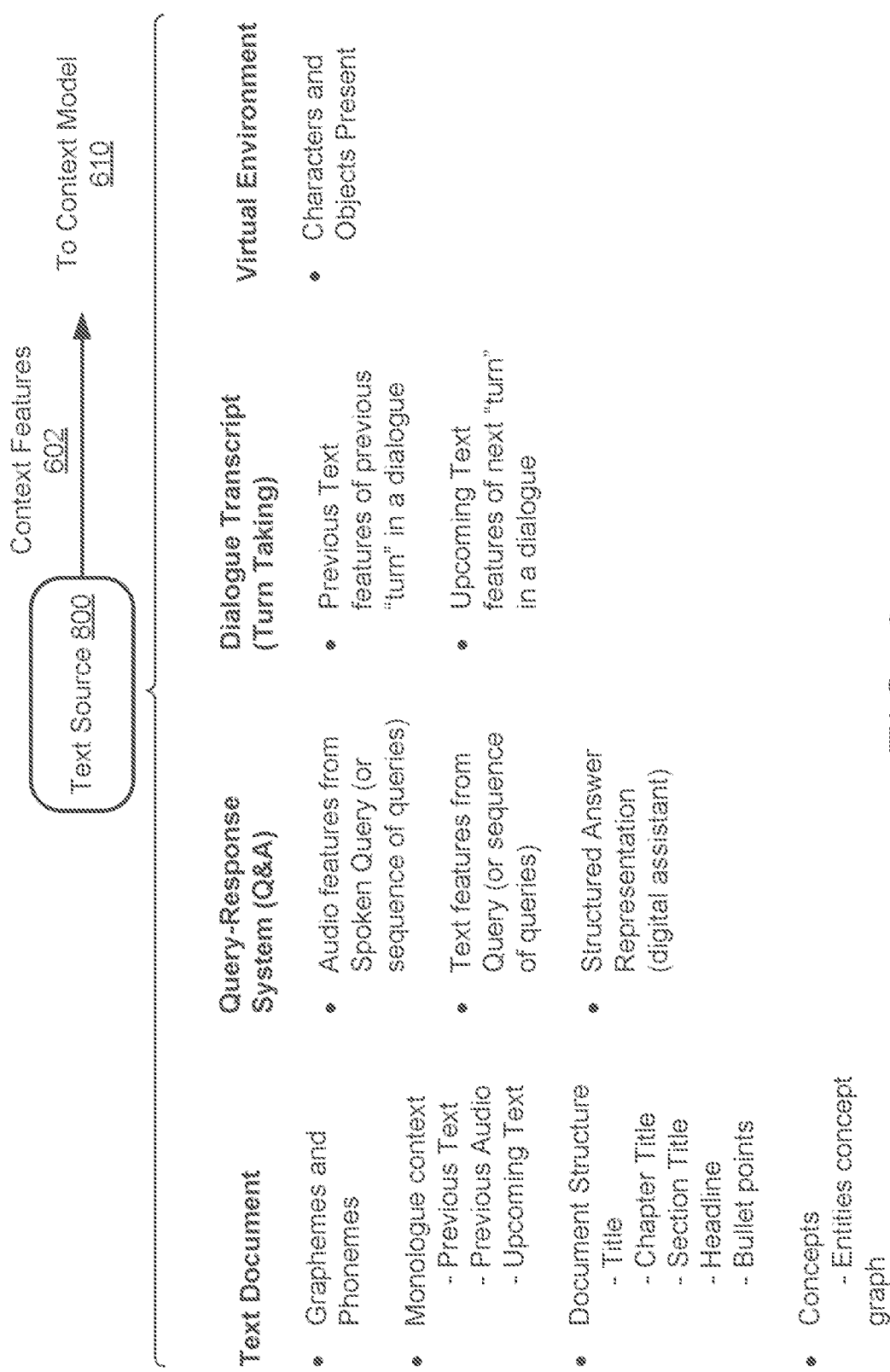
FIG. 8 is a schematic view of an example test source.

FIG. 6B shows the context-prediction system 600 omitting the reference encoder 400 and the style token layer 510 during the inference stage for predicting the style embedding $S_E$ 550P from the current input text 502 (Tt) and the one or more context features 602 associated with the current input text 502. The text-prediction model 520 may predict the style embedding $S_E$ 550P via either of the first text-prediction pathway (FIG. 5A) or the second text-prediction pathway (FIG. 5B). Here, the current input text 502 corresponds to current input text from a text source 800 (FIG. 8) the TTS model 650 is to synthesize into expressive speech FIG. 8 shows example text sources 800 that include sequences of text to be synthesized into expressive speech. The text sources 800 are provided for example only, and may include other text sources 800 (not shown) that include text capable of being synthesized into expressive speech. The text sources 800 may include a text document, a dialogue transcript, a query-response system, or a virtual environment. The text document can encompass a wide variety of documents, from long-form text documents, such as novels/text books, to short-form documents, such as a web-page or conversational document.

For text documents, context features 602 may include monologue context such as previous text (e.g., N sentences prior to the current text 502), previous audio 670 corresponding to the previous text, upcoming text (e.g., N sentences after the current text 502) For instance, previous text describing a sad event can help predict a style embedding for synthesizing expressive speech of current text that conveys a prosody/style indicative of sad emotion. Context features 602 may also be derived from document structure such as title, chapter title, section title, a headline, bullet points, etc. Text documents may also include concepts such as entities from a concept graph (e.g., a Wikipedia entry) that may be extracted as context features 602.

For a query-response system (e.g., question and answering), the context features 602 may include audio/text, features from a spoken query or text features from a textual query which the current text 502 corresponds to a transcript of a response to be synthesized into expressive speech. The context features 602 may include the audio/text features from a sequence of queries that leads to a current response. Additionally or alternatively, the context features 602 may be extracted from a structured answer representation of the response used by a digital assistant. For a dialogue transcript (turn taking), the context features 602 may include previous text features of a previous "turn" in a dialogue and/or upcoming text features of a next "turn" in the dialogue. A text source 800 corresponding to a virtual environment may provide context features 802 corresponding to any characters and/or objects present in the virtual environment.

Referring back to the inference stage of FIG. 6B, the current input text 502 may be a piece of text (e.g., one or more sentences) included in a text source 800, such as a book (e.g., text document), and the one or more context features 602 are derived from the text source 800. For instance, the text document may be an electronic book (e-book) and a computing device 900 may execute e-reader software that synthesizes the e-book into expressive speech 680. Accordingly, the computing device 900 executing the e-reader software may execute the context-prediction system 600 to synthesize expressive speech 680 having a natural sounding prosody/style based on the input text 502 and the context features 602 only (e.g., without using any auxiliary inputs that control/select prosody/style) In another example, when the text source 800 includes the dialogue transcript, the current input text 502 to be synthesized corresponds to a current turn in the dialogue transcript. In this example, the context features 602 may include previous text in the dialogue transcript that correspond to a previous turn in the dialogue transcript, and/or upcoming text in the dialogue transcript that corresponds to a next turn in the dialogue transcript. In yet another example, when the text source 800 includes the query-response system (e.g., such as a digital assistant) that allows a user to input text or spoken queries to a computing device 900 (FIG. 9) and a search engine (remote or on the user device) fetches a response to be synthesized into expressive speech 680 for audible output from the computing device, the current input text corresponds to the response to the current query and the context features include at least one of text associated with the current query or text associated with a sequence of queries received at the query response-system or audio features associated with the current query or audio features associated with the sequence of queries received at the query response-system. These context features 602 can be easily derived from the text source 800 to provide additional context for more precisely predicting the style embedding $S_E$ 550 that best conveys the natural style/prosody of the expressive speech 680 synthesized from the current input text 502.

FIGS. 7A-7D illustrate example contextual TTS networks 700a-d implementing the context-prediction system 600 of FIGS. 6A and 6B for synthesizing expressive speech over multiple time steps. While the TTS networks 700a-d utilize both context features 602 and input text 502 for predicting a style embedding $S_E$ 550, the TTS networks 700a-d can be modified to predict the style embedding $S_E$ 550 using only the input text 502 as described above with respect to the text-prediction system 500 of FIGS. 5A and 5B. For simplification, the contextual TTS networks 700a-d include the TTS model 650 and a context module 710 that collectively includes the context model 610 and the text-prediction model 520 described above with reference to FIGS. 6A and 6B. In configurations when only the current input text is used (e.g., implementing text-prediction system 500), the context module 710 may simply include the text-prediction model 520 in which the current input text is the only context module input to the context module 710. As used herein, "T" denotes the text input 502, "t" denotes an index indicating the time step, "x" denotes a context module input, "y" denotes the output audio signal 670 output from the TTS model 650, and "SE" denotes the style embedding 550.

Figure 7A:
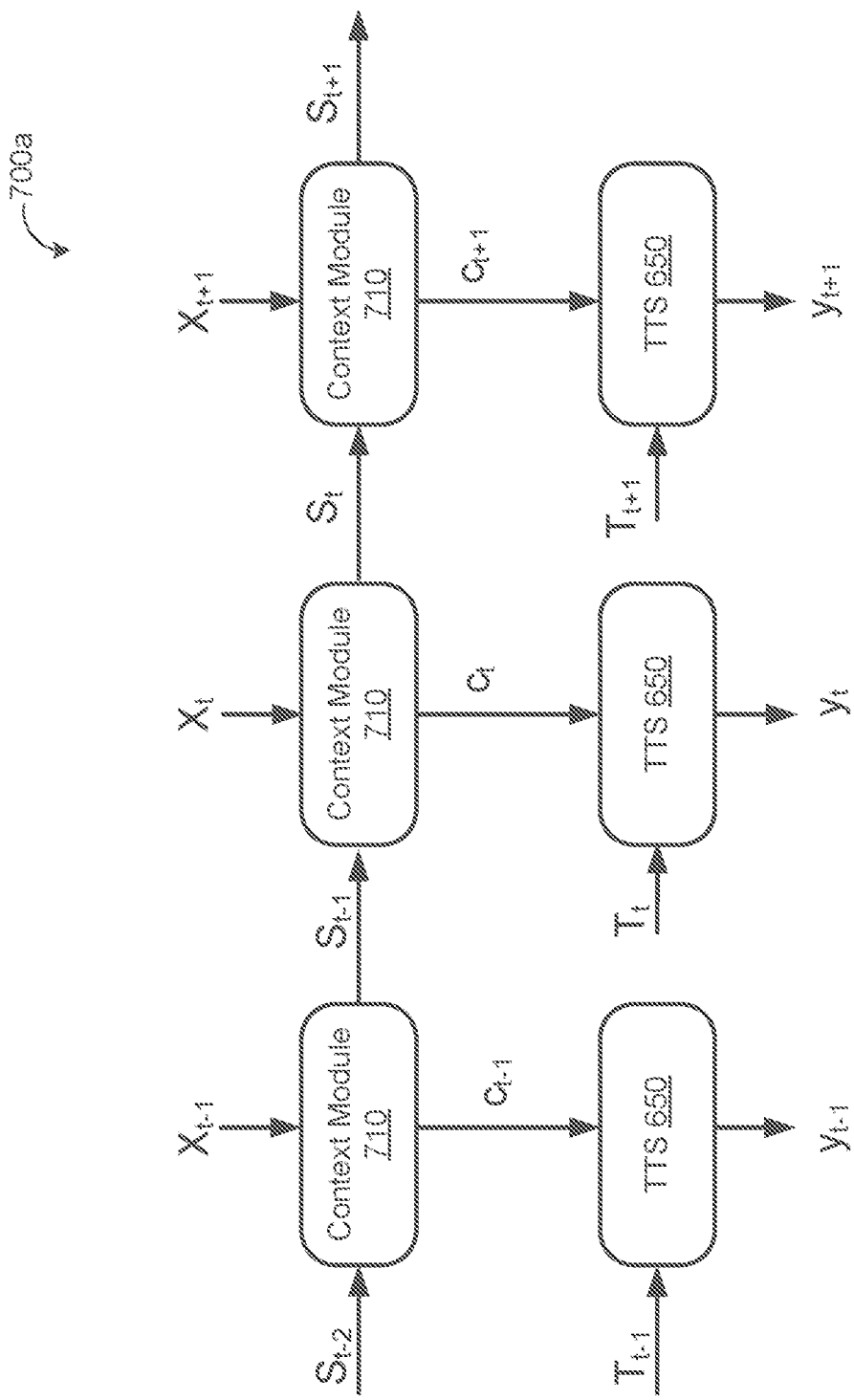
FIGS. 7A-7D are schematic views of example contextual text-to-speech (TTS) models.

FIG. 7A shows a schematic view of a full contextual TTS network 700a that trains a single model end-to-end to minimize audio reconstruction error and is able to compute, at each time step, a respective context state $(s_{t-2}, s_{t-1}, s_t, s_{t+1})$ of the context module 710 using attention over all previous context module inputs $(x_{t-1}, x_t, x_{t+1})$. During each time step (t−1, t, t+1), the context module 710 receives the context state $(s_{t-2}, s_{t-1}, s_t, s_{t+1})$ output from the context module 710 at a previous time step and a context module input $(x_{t-1}, x_t, x_{t+1})$ that includes any combination of the current text input $T_t$, a previous text input $T_{t-1}$, and a previous output audio signal $y_{t-1}$. Here, the previous output audio signal corresponds to the output audio signal output from the TTS model 650 for the previous input text $T_{t-1}$ of the previous time step t−1. During each time step (e.g., the current time step "t"), the context module 710 computes a corresponding context output $(c_t)$ by processing the context state $(s_{t-1})$ and the current context module input $(x_t)$. In some examples, the context module input $x_t$ may also include upcoming text $T_{t+1}$ to be synthesized by the TTS model 650 during the subsequent time step t+1 with or without any combination of the other aforementioned inputs. This option may be specifically beneficial for long-form applications, such as an e-reader running on a computing device for synthesizing speech of text in an e-books. In some implementations, when the TTS model 650 is for conversational speech synthesis, the network 700a is trained using reconstruction loss (RL) in a real environment with a perfect reward function. In these implementations, the context module input $x_t$ may further include one or more environmental inputs $E_t$ associated with the conversational speech synthesis.

Figure 7B:
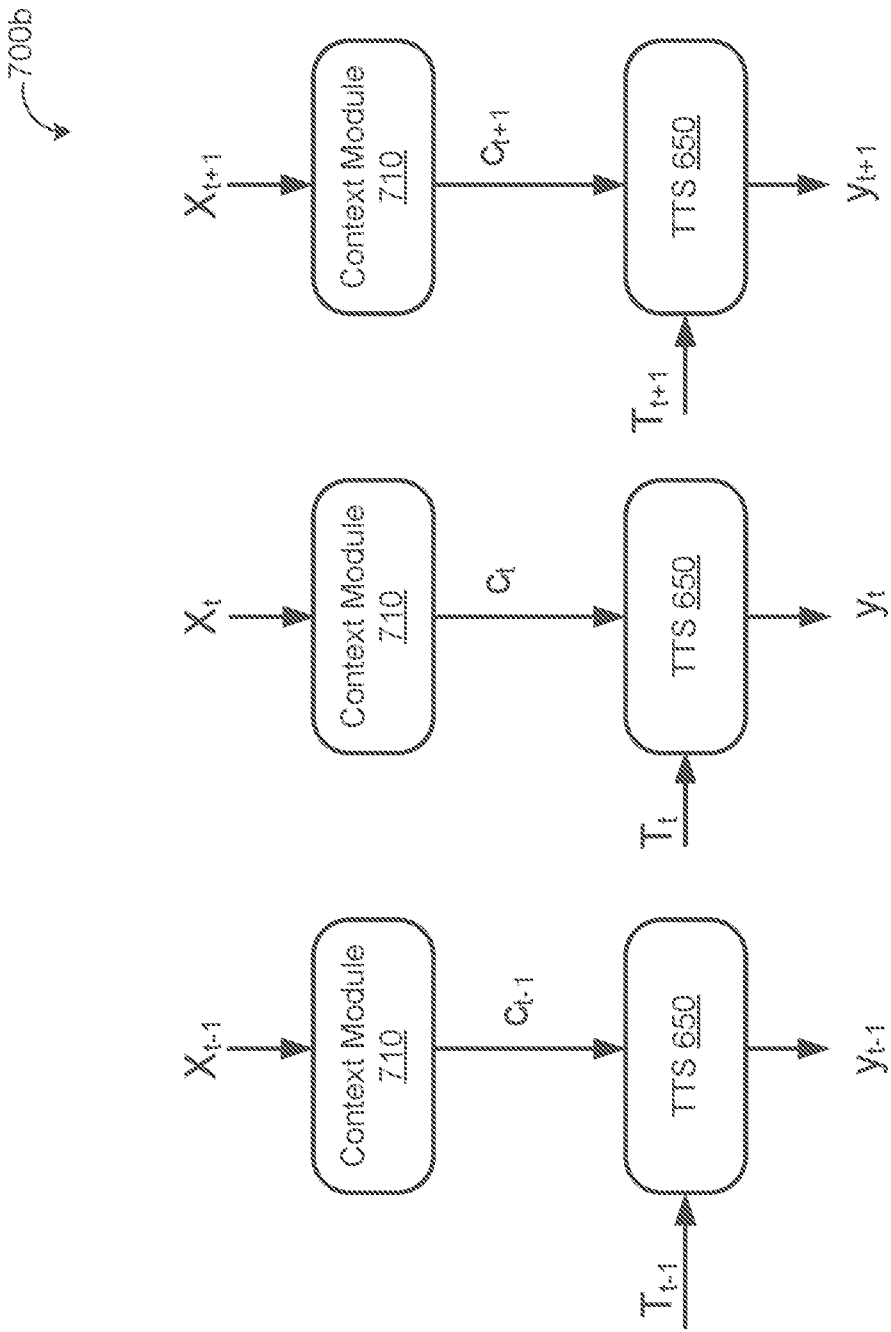

FIG. 7B shows a schematic view of a one-step contextual TTS network 700b that does not compute context state over all previous context module inputs as in the network 700a of FIG. 7A. Instead, during each time step (e.g., the current time step "t"), the context module 710 receives only the context module input $(x_{t-1}, x_t, x_{t+1})$ that includes any combination of the current text input $T_t$, a previous text input $T_{t-1}$, and a previous output audio signal $y_{t-1}$, and computes a corresponding context output $(c_t)$ by processing the current context module input $(x_t)$. The context module input $x_t$ may further include one or more environmental inputs $E_t$ associated with the conversational speech synthesis. As with the full contextual TTS network 700a of FIG. 7A, the one-step contextual TTS network 700b trains a single model end-to-end, but is unable to track long-term context since context state using attention over all previous context module inputs is not computed. In some examples, the network 700b trains on a truncated Markov (one-step) state to increase training efficiency.

Figure 7C:
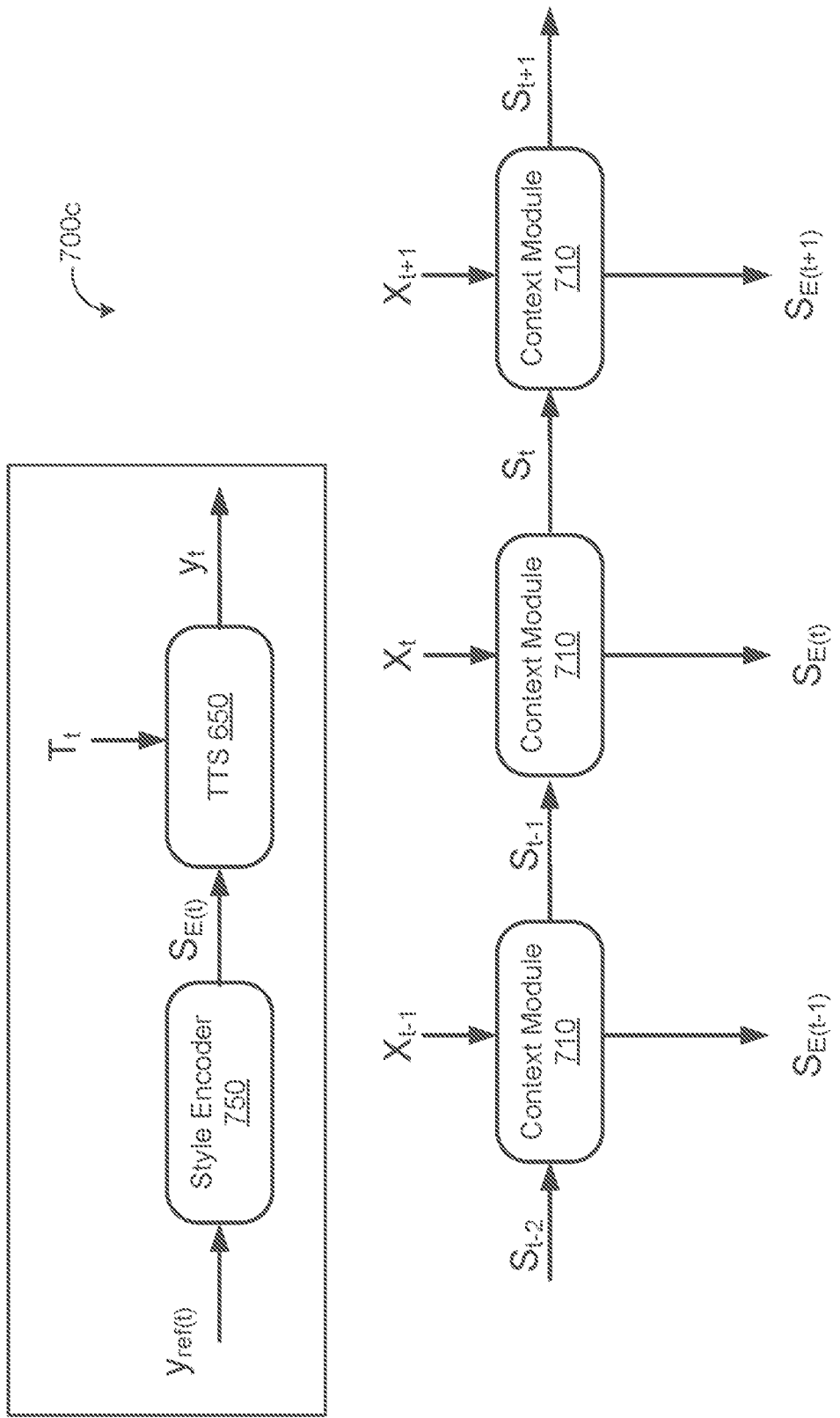

FIG. 7C shows a schematic view of a decoupled full contextual TTS network 700c in which the context module 710 and the TTS model 650 are trained separately, rather than training a single model end-to-end. That is, the network 700c is trained using a two-step training procedure. For instance, the TTS model 650 is pre-trained during a first step of the training procedure in conjunction with a style encoder 750 configured to produce, for each time step (t), a target style embedding $S_{E(t)}$ based on a reference audio signal $y_{ref(t)}$. In some examples, the style encoder 750 collectively includes the prosody encoder 400 and style token layer 410 of FIGS. 5A and 5B. The TTS model 650 then receives and processes the input text Tt and the target style embedding $S_E$ to produce the output audio signal $y_t$. Here, for the current time step t, the output audio signal $y_t$ matches the reference audio signal $y_{ref(t)}$ the input text Tt corresponds to a transcript of the reference audio signal $y_{ref(t)}$.

During a second step of the two-step training procedure, the decoupled context module 710 uses the target style embedding $S_{E(t)}$ produced by the pre-trained style encoder 750 for each time step (t) for predicting a corresponding style embedding $S_{E(t)}$. As with the full contextual TTS network 700a of FIG. 7A, the decoupled full contextual TTS network 700b is able to compute, at each time step, a respective context state $(s_{t-2}, s_{t-1}, s_t, s_{t+1})$ of the context module 710 using attention over all previous context module inputs $(x_{t-1}, x_t, x_{t+1})$. However, since the context module 710 is decoupled, the context module inputs $(x_{t-1}, x_t, x_{t+1})$ at each time step do not include a previous output audio signal that was output from the TTS model 650 for previous input text $T_{t-1}$ of the previous time step t-1. Instead, the context module inputs at each time step include any combination of the current input text $T_t$, a previous style embedding $s_{E(t-1)}$, and upcoming text $T_{t+1}$ to be synthesized by the TTS model 650 during the subsequent time step t+1. Here, the previous style embedding $S_{E(t-1)}$ includes corresponds to the style embedding output from the context module 710 for the previous context module input $x_{t-1}$ of the previous time step t-1.

Figure 7D:
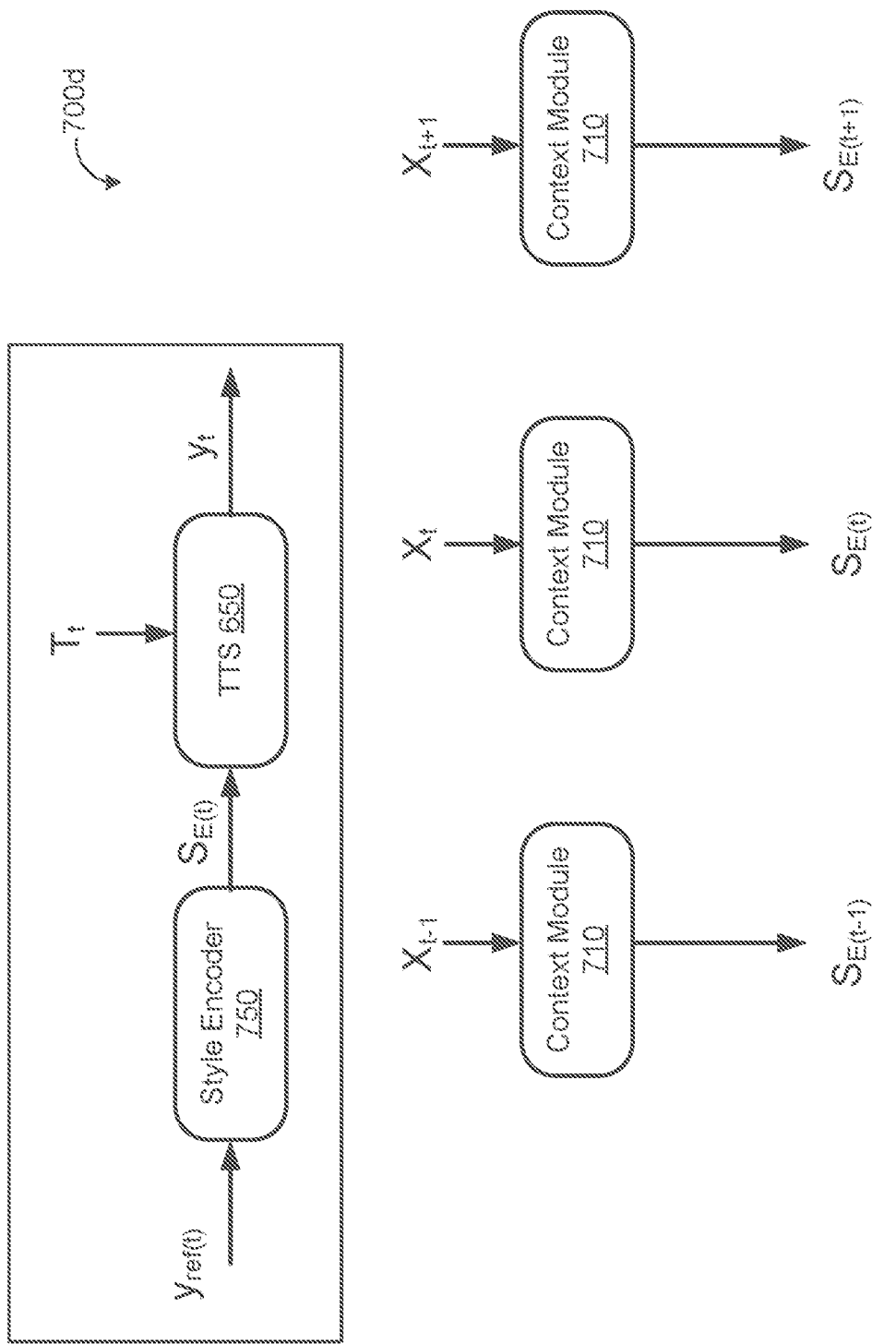

FIG. 7D shows a schematic view of a decoupled one-step contextual TTS network 700d that does not compute context state over all previous context module inputs as in the network 700c of FIG. 7C. Instead, during each time step (e.g., the current time step "t"), the context module 710 receives only the context module input $(x_{t-1}, x_t, x_{t+1})$ that includes any combination of the current input text $T_t$, a previous style embedding $S_{E(t-1)}$, and upcoming text $T_{t+1}$, and then computes/predicts a corresponding current style embedding $S_{E(t)}$ by processing the current context module input $(x_t)$. The context module input $x_t$ may further include one or more environmental inputs $E_t$ associated with the conversational speech synthesis. As with the decoupled full contextual TTS network 700c of FIG. 7D, the decoupled one-step contextual TTS network 700d is trained using the two-step training procedure in which the style encoder 750 and TTS model 650 are decoupled and pre-trained separately from the context module 710, but is unable to track long-term context since context state using attention over all previous context module inputs is not computed.

By decoupling the context module 710 from the TTS model 650, the networks 700c, 700d each provide a good training efficiency, wherein the ability to track long-term context is only available in network 700c. Additionally, decoupling the TTS model 650 permits using the TTS model 650 for both a context mode (as described in FIGS. 5A-6B) and prosody/style transfer (e.g., "say it like this") in which the style embedding space serves as a control interface. That is, a single TTS model 650 can be trained for use in both the context mode, in which style embeddings are produced (without using a reference audio signal or a manual style embedding selection) from input text alone (text-prediction system 500 of FIGS. 5A and 5B) or combinations of input text and context features (context-prediction system 600 of FIGS. 6A and 6B), and prosody transfer, in which a reference audio signal (e.g., say it like this) or manual style embedding selection are provided at inference for transferring prosody style from one speaker to another.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 9:
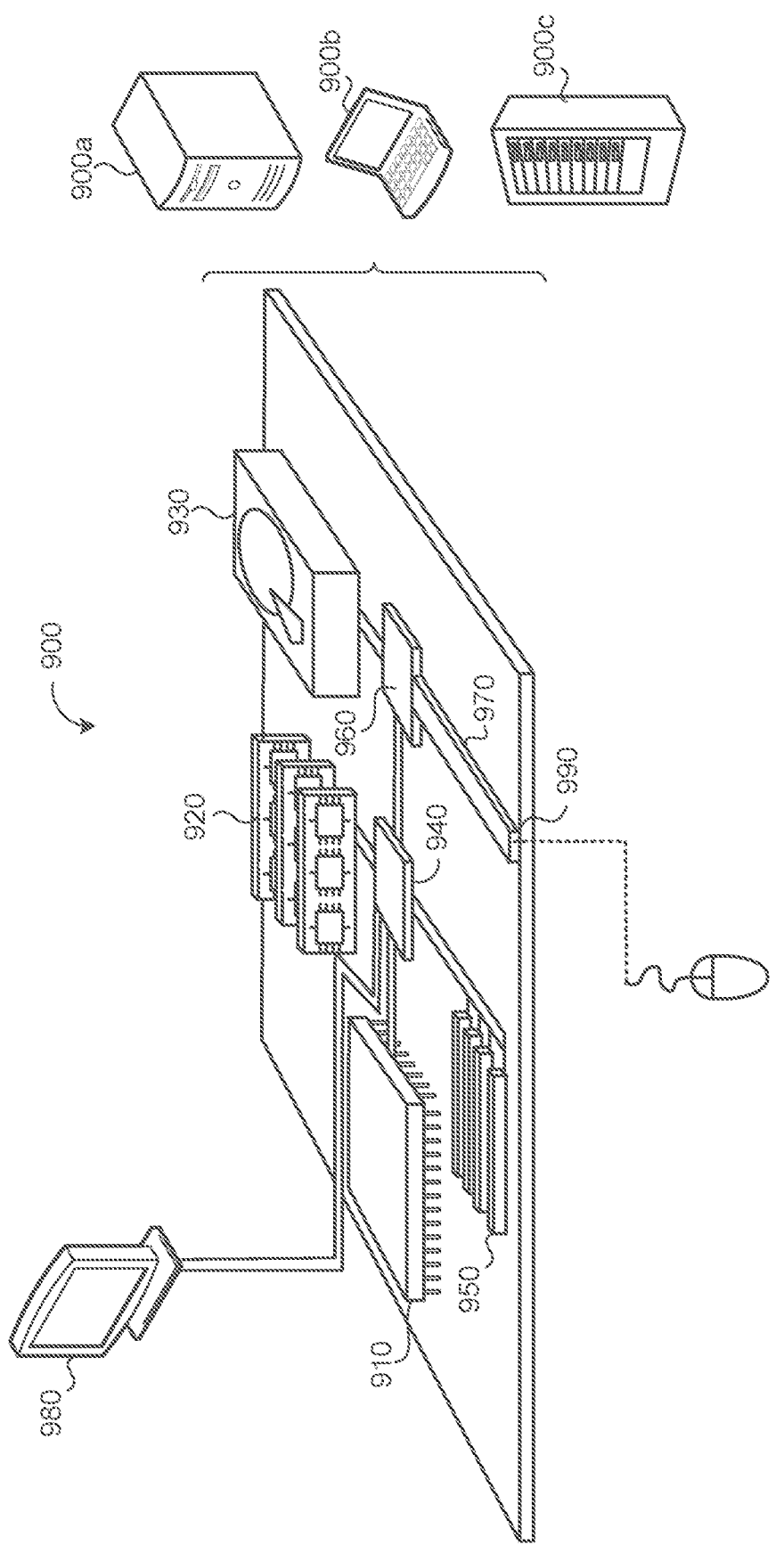
FIG. 9 is a schematic view of an example computing device that may be used to implement the systems and methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes data processing hardware (e.g., a processor) 910, memory 920, a storage device 930, a high-speed interface/controller 940 connecting to the memory 920 and high-speed expansion ports 950, and a low speed interface/controller 960 connecting to a low speed bus 970 and a storage device 930. The computing device 900 may provide (via execution on the data processing hardware 910) the text-to speech conversion system 100, the TTS models 150, 650, the reference encoder 400, the deterministic reference encoder 400, the context model 610, and the text-prediction model 520. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unites), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Figure 10:
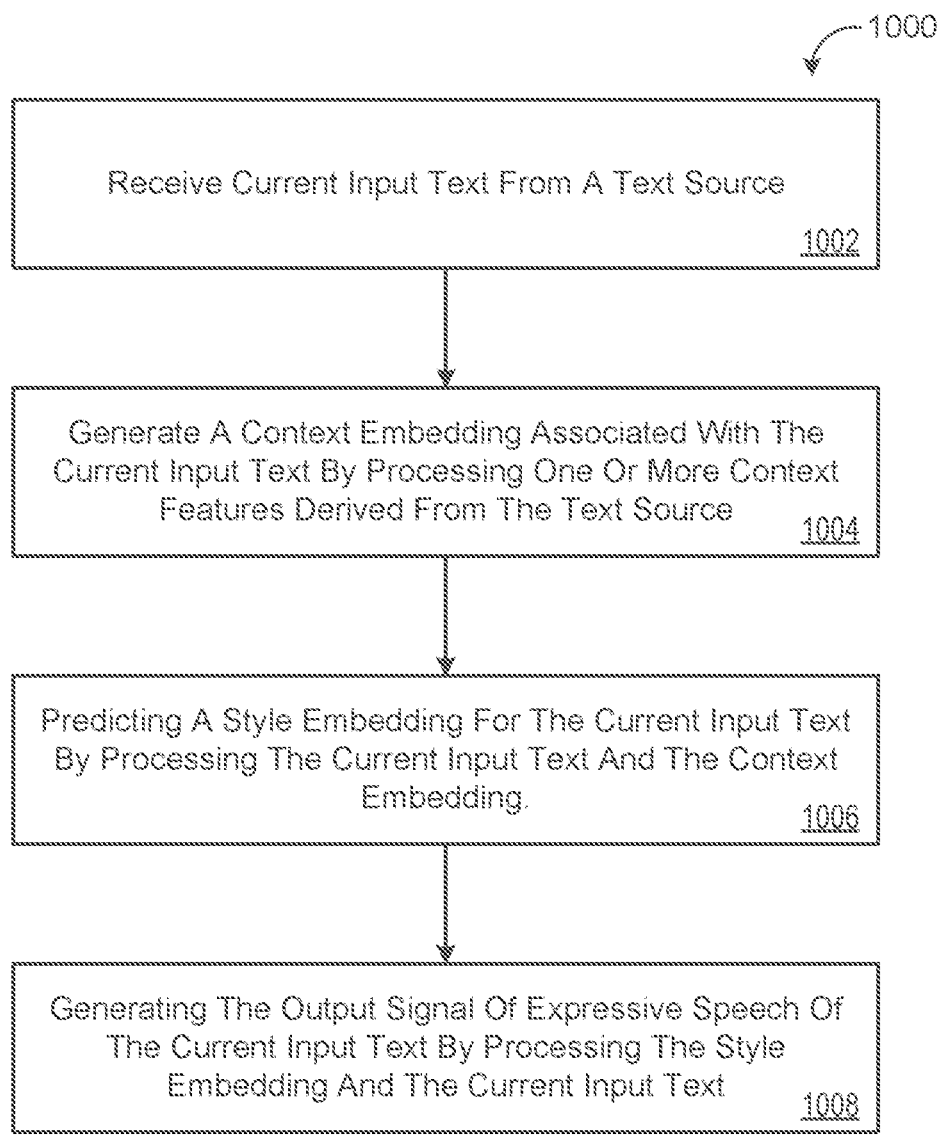
FIG. 10 is a flowchart of an example arrangement of operations for a method of generating an output audio signal of expressive speech.

FIG. 10 shows a flowchart of an example arrangement of operations for a method 1000 of generating an output signal 670 for expressive synthesized speech 680 from input text 502. The method may be described with reference to FIGS. 5A-6B. Data processing hardware 910 (FIG. 9) may execute instructions stored on memory hardware 920 to perform the example arrangement of operations for the method 1000. At operation 1002, the method 1000 includes receiving, at the data processing hardware 910, current input text 502 from a text source 800. Here, the current input text 502 is to be synthesized into expressive speech 680 by a text-to-speech (TTS) model 650.

At operation 1004, the method 1000 includes generating, by the data processing hardware 910, using a context model 610, a context embedding 612 associated with the current input text 502 by processing one or more context features 602 derived from the text source 800. At operation 1006, the method 1000 includes predicting, by the data processing hardware 910, using a text-prediction network (also referred to as "text-prediction model) 520, a style embedding 550 for the current input text 502 by processing the current input text 502 and the context embedding 612 associated with the current input text 502. Notably, the style embedding 550 predicted by the text-prediction network 520 specifies a specific prosody and/or style for synthesizing the current input text 502 into expressive speech 680. The style embedding 550 may be predicted by either one of the text-prediction network 520a of FIG. 5A or the text-prediction network 520b of FIG. 5B.

At operation 1008, the method 1000 also includes generating, by the data processing hardware 910, using the TTS model 650, the output audio signal 670 of expressive speech 680 of the current input text 502 by processing the style embedding 550 and the current input text 502. Here, the output audio signal 670 has the specific prosody and/or style specified by the style embedding 550. As discussed above, the ITS model 650 (or other system downstream from the model 650) uses a synthesizer 675 to synthesize the resulting expressive speech 680. Thus, the expressive speech 680 refers to synthesized speech.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks: and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a users client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A system comprising:
a context encoder configured to:
receive one or more context features associated with current input text to be synthesized into expressive speech, each context feature derived from a text source of the current input text; and
process the one or more context features to generate a context embedding associated with the current input text;
a text encoder configured to:
receive the current input text from the text source; and
process the current input text to generate a text encoding of the current input text;
a text-prediction network in communication with the context encoder and configured to:
receive the text encoding of the current input text from the text encoder, the text source comprising sequences of text to be synthesized into expressive speech;
receive the context embedding associated with the current input text from the context encoder; and
process the text encoding of the current input text and the context embedding associated with the current input text to predict, as output, a style embedding for the current input text, the style embedding specifying a specific prosody and/or style for synthesizing the current input text into expressive speech,
wherein the text-prediction network comprises:
a time-aggregating gated recurrent unit (GRU) recurrent neural network (RNN) configured to:
receive the context embedding associated with the current input text and the text encoding of the current input text; and
generate a fixed-length feature vector by processing the context embedding and the text encoding; and
one or more fully-connected layers configured to predict the style embedding by processing the fixed-length feature vector; and
a text-to-speech model in communication with the text-prediction network and configured to:
receive the current input text from the text source;
receive the style embedding predicted by the text-predication network; and
process the current input text and the style embedding to generate an output audio signal of expressive speech of the current input text, the output audio signal having the specific prosody and/or style specified by the style embedding.

2. The system of claim 1, wherein the one or more context features associated with the current input text comprise at least one of:
- the current input text;
- previous text from the text source that precedes the current input text;
- previous speech synthesized from the previous text;
- upcoming text from the text source that follows the current input text; or
- a previous style embedding predicted by the text-prediction network based on the previous text and a previous context embedding associated with the previous text.

3. The system of claim 1, wherein:
the text source comprises a text document; and
the one or more context features associated with the current input text comprise at least one of:
- a title of the text document;
- a title of a chapter in the text document;
- a title of a section in the text document;
- a headline in the text document;
- one or more bullet points in the text document;
- entities from a concept graph extracted from the text document; or
- one or more structured answer representations extracted from the text document.

4. The system of claim 1, wherein:
the text source comprises a dialogue transcript;
the current input text corresponds to a current turn in the dialogue transcript; and
the one or more context features associated with the current input text comprises at least one of:
- previous text in the dialogue transcript that corresponds to a previous turn in the dialogue transcript; or
- upcoming text in the dialogue transcript that corresponds to a next turn in the dialogue transcript.

5. The system of claim 1, wherein:
the text source comprises a query-response system;
the current input text corresponds to a response to a current query received at the query-response system; and
the one or more context features associated with the current input text comprises at least one of:
- text associated with the current query or text associated with a sequence of queries received at the query-response system, the sequence of queries comprising the current query and one or more queries preceding the current query; or
- audio features associated with the current query or audio features associated with the sequence of queries received at the query-response system.

6. The system of claim 1, wherein the text-to-speech model comprises:
a concatenator configured to:
- receive the text encoding of the current input text from the text encoder;
- receive the style embedding predicted by the text-prediction network; and
- generate a concatenation between the text encoding of the current input text and the style embedding; and
an attention-based decoder recurrent neural network configured to:
- receive a sequence of decoder inputs; and
- for each decoder input in the sequence, process the corresponding decoder input and the concatenation between the text encoding of the current input text and the style embedding to generate r frames of the output audio signal, wherein r comprises an integer greater than one.

7. The system of claim 6, wherein the text encoder comprises:
an encoder pre-net neural network configured to:
- receive a respective embedding of each character in a sequence of characters of the current input text; and
- for each character, process the respective embedding to generate a respective transformed embedding of the character; and
an encoder CBHG neural network configured to:
- receive the transformed embeddings generated by the encoder pre-net neural network; and
- process the transformed embeddings to generate the text encoding of the current input text.

8. The system of claim 7, wherein the encoder CBHG neural network comprises a bank of 1-D convolutional filters, followed by a highway network, and followed by a bidirectional recurrent neural network.

9. The system of claim 1, wherein the one or more fully-connected layers comprise one or more hidden fully-connected layers using ReLU activations and an output layer that uses tanh activation to emit the predicted style embedding.

10. The system of claim 1, wherein the context encoder, the text-prediction network, and the text-to-speech model are trained jointly.

11. The system of claim 1, wherein a two-step training procedure trains the text-to-speech model during a first step of the training procedure and separately trains the context encoder and the text-prediction network jointly during a second step of the training procedure.

12. A method for generating an output audio signal of expressive synthesized speech, the method comprising:
- receiving, at data processing hardware, current input text from a text source, the current input text to be synthesized into expressive speech by a text-to-speech model;
- generating, by the data processing hardware, using a context model, a context embedding associated with current input text by processing one or more context features derived from the text source;
- processing, by the data processing hardware, using a text encoder, the current input text to generate a text encoding of the current input text;
- predicting, by the data processing hardware, using a text-prediction network, a style embedding for the current input text by processing the text encoding of the current input text and the context embedding associated with the current input text, the style embedding specifying a specific prosody and/or style for synthesizing the current input text into expressive speech, wherein predicting the style embedding for the current input text comprises:
  - generating, using a time-aggregating gated recurrent unit (GRU) recurrent neural network (RNN) of the text-prediction network, a fixed-length feature vector by processing the context embedding associated with the current input text and the text encoding of the current input text; and
  - predicting, using one or more fully-connected layers of the text-prediction network that follow the GRU-RNN, the style embedding by processing the fixed-length feature vector; and
- generating, by the data processing hardware, using the text-to-speech model, the output audio signal of expressive speech of the current input text by processing the style embedding and the current input text, the output audio signal having the specific prosody and/or style specified by the style embedding.

13. The method of claim 12, wherein the one or more context features associated with the current input text comprise at least one of:
the current input text;
previous text from the text source that precedes the current input text;
previous speech synthesized from the previous text;
upcoming text from the text source that follows the current input text; or
a previous style embedding predicted by the text-prediction network based on the previous text and a previous context embedding associated with the previous text.

14. The method of claim 12, wherein:
the text source comprises a text document; and
the one or more context features associated with the current input text comprise at least one of:
a title of the text document;
a title of a chapter in the text document;
a title of a section in the text document;
a headline in the text document;
one or more bullet points in the text document;
entities from a concept graph extracted from the text document; or
one or more structured answer representations extracted from the text document.

15. The method of claim 12, wherein:
the text source comprises a dialogue transcript;
the current input text corresponds to a current turn in the dialogue transcript; and
the one or more context features associated with the current input text comprises at least one of:
previous text in the dialogue transcript that corresponds to a previous turn in the dialogue transcript; or
upcoming text in the dialogue transcript that corresponds to a next turn in the dialogue transcript.

16. The method of claim 12, wherein:
the text source comprises a query-response system;
the current input text corresponds to a response to a current query received at the query-response system; and
the one or more context features associated with the current input text comprises at least one of:
text associated with the current query or text associated with a sequence of queries received at the query-response system, the sequence of queries comprising the current query and one or more queries preceding the current query; or
audio features associated with the current query or audio features associated with the sequence of queries received at the query-response system.

17. The method of claim 12, wherein generating the output audio signal comprises:
generating, using a concatenator of the text-to-speech model, a concatenation between the text encoding of the current input text and the style embedding;
receiving, at an attention-based decoder recurrent neural network of the text-to-speechmodel, a sequence of decoder inputs; and
for each decoder input in the sequence of decoder inputs, processing, using the attention-based decoder recurrent neural network, the corresponding decoder input and the concatenation between the text encoding of the current input text and the style embedding to generate r frames of the output audio signal, wherein r comprises an integer greater than one.

18. The method of claim 17, wherein generating the text encoding of the current input text comprises:
receiving, at an encoder pre-net neural network of the text encoder, a respective embedding of each character in a sequence of characters of the current input text;
for each character in the sequence of characters, processing, using the encoder pre-net neural network, the respective embedding to generate a respective transformed embedding of the character; and
generating, using an encoder CBHG neural network of the text encoder, the text encoding of the current input text by processing the transformed embeddings.

19. The method of claim 18, wherein the encoder CBHG neural network comprises a bank of 1-D convolutional filters, followed by a highway network, and followed by a bidirectional recurrent neural network.

20. The method of claim 12, wherein the one or more fully-connected layers comprise one or more hidden fully-connected layers using ReLU activations and an output layer that uses tanh activation to emit the predicted style embedding.

21. The method of claim 12, wherein the context model, the text-prediction network, and the text-to-speech model are trained jointly.

22. The method of claim 12, wherein a two-step training procedure trains the text-to-speech model during a first step of the training procedure and separately trains the context model and the text-prediction network jointly during a second step of the training procedure.

* * * * *